(12) United States Patent
Soriano et al.

(10) Patent No.: US 9,940,074 B1
(45) Date of Patent: Apr. 10, 2018

(54) METHOD TO DETERMINE THE BEST PRINTING DEVICE AMONGST A GROUP OF PRINTING DEVICES USING AN IN-LINE SPECTROPHOTOMETER

(71) Applicant: Konica Minolta Laboratory U.S.A., Inc., San Mateo, CA (US)

(72) Inventors: Randy Cruz Soriano, San Leandro, CA (US); Kenneth Huang Young, San Mateo, CA (US); Kazuto Yamamoto, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/476,140

(22) Filed: Mar. 31, 2017

(51) Int. Cl.
*G06F 3/12* (2006.01)
*H04N 1/00* (2006.01)

(52) U.S. Cl.
CPC ............ *G06F 3/1208* (2013.01); *G06F 3/126* (2013.01); *G06F 3/1272* (2013.01); *G06F 3/1287* (2013.01); *H04N 1/00023* (2013.01); *H04N 1/00034* (2013.01); *H04N 1/00045* (2013.01); *H04N 1/00087* (2013.01); *H04N 2201/0005* (2013.01); *H04N 2201/0082* (2013.01)

(58) Field of Classification Search
CPC ...... G06F 3/1208; G06F 3/126; G06F 3/1287; G06F 3/1272; H04N 1/00023; H04N 1/00034; H04N 1/00087; H04N 1/00045; H04N 2201/0082; H04N 2201/0005
USPC ....................................................... 358/1.15
See application file for complete search history.

(56) References Cited

U.S. PATENT DOCUMENTS

| 9,667,838 B1* | 5/2017 | Soriano .............. H04N 1/00045 |
| 2002/0093648 A1* | 7/2002 | Nikoonahad ........ G01N 21/211 |
| | | 356/237.1 |
| 2004/0160641 A1 | 8/2004 | Kohler et al. |
| 2006/0158672 A1 | 7/2006 | Kondo |
| 2008/0204771 A1 | 8/2008 | Albat et al. |
| 2008/0225328 A1 | 9/2008 | Milton |
| 2009/0231623 A1 | 9/2009 | Kuwahara |
| 2010/0124362 A1 | 5/2010 | Wu et al. |

(Continued)

FOREIGN PATENT DOCUMENTS

| JP | 2010-019732 A | 1/2010 |
| JP | 2011-159085 A | 8/2011 |

*Primary Examiner* — Allen H Nguyen
(74) *Attorney, Agent, or Firm* — Buchanan Ingersoll & Rooney PC

(57) ABSTRACT

A print management method implemented in a system including a client computer, a server, and a plurality of printers is disclosed, which includes by the server: (a) receiving, from a client computer, a request relating to a print job; (b) determining whether a predetermined print quality is required for the print job; (c) filtering at least two printers each of which has an in-line spectrophotometer from the plurality of printers; (d) instructing the each filtered at least two printers to conduct a color validation process by using the in-line spectrophotometer; (e) receiving, from the each filtered at least two printers, a result corresponding to the color validation process by the in-line spectrophotometer; and (f) determining at least one candidate of a destination printer for the print job based on whether the each filtered at least two printers meets predetermined print quality, using the result corresponding to the color validation process.

20 Claims, 30 Drawing Sheets

(56) References Cited

U.S. PATENT DOCUMENTS

| | | |
|---|---|---|
| 2010/0231936 A1 | 9/2010 | Nagai |
| 2011/0089316 A1* | 4/2011 | Hosier .................... G01J 3/12 250/252.1 |
| 2011/0157617 A1 | 6/2011 | Yamazaki |
| 2012/0044540 A1* | 2/2012 | Dalal .................. H04N 1/6033 358/1.18 |
| 2012/0105927 A1* | 5/2012 | Mestha ............... H04N 1/6022 358/518 |
| 2012/0188596 A1 | 7/2012 | Niles et al. |
| 2015/0049921 A1 | 2/2015 | Crean et al. |
| 2015/0138561 A1* | 5/2015 | Sano ...................... G01J 3/26 356/454 |

* cited by examiner

|  | Target color | | |
|---|---|---|---|
|  | L* | a* | b* |
| Patch [1] | L*target(1) | a*target(1) | b*target(1) |
| Patch [2] | L*target(2) | a*target(2) | b*target(2) |
| Patch [3] | L*target(3) | a*target(3) | b*target(3) |
| Patch [4] | L*target(4) | a*target(4) | b*target(4) |
| Patch [5] | L*target(5) | a*target(5) | b*target(5) |
| Patch [6] | L*target(6) | a*target(6) | b*target(6) |
| Patch [7] | L*target(7) | a*target(7) | b*target(7) |
| Patch [8] | L*target(8) | a*target(8) | b*target(8) |
| Patch [9] | L*target(9) | a*target(9) | b*target(9) |
| Patch [10] | L*target(10) | a*target(10) | b*target(10) |
| Patch [11] | L*target(11) | a*target(11) | b*target(11) |
| Patch [12] | L*target(12) | a*target(12) | b*target(12) |
| Patch [13] | L*target(13) | a*target(13) | b*target(13) |
| Patch [14] | L*target(14) | a*target(14) | b*target(14) |
| Patch [15] | L*target(15) | a*target(15) | b*target(15) |
| Patch [16] | L*target(16) | a*target(16) | b*target(16) |
| Patch [17] | L*target(17) | a*target(17) | b*target(17) |
| Patch [18] | L*target(18) | a*target(18) | b*target(18) |
| Patch [19] | L*target(19) | a*target(19) | b*target(19) |
| Patch [20] | L*target(20) | a*target(20) | b*target(20) |
| Patch [21] | L*target(21) | a*target(21) | b*target(21) |
| Patch [22] | L*target(22) | a*target(22) | b*target(22) |
| Patch [23] | L*target(23) | a*target(23) | b*target(23) |
| Patch [24] | L*target(24) | a*target(24) | b*target(24) |
| Patch [25] | L*target(25) | a*target(25) | b*target(25) |
| Patch [26] | L*target(26) | a*target(26) | b*target(26) |
| . | . | . | . |
| . | . | . | . |
| . | . | . | . |

|  | Measured data | | |
|---|---|---|---|
|  | L* | a* | b* |
| Patch [1] | L*measured(1) | a*measured(1) | b*measured(1) |
| Patch [2] | L*measured(2) | a*measured(2) | b*measured(2) |
| Patch [3] | L*measured(3) | a*measured(3) | b*measured(3) |
| Patch [4] | L*measured(4) | a*measured(4) | b*measured(4) |
| Patch [5] | L*measured(5) | a*measured(5) | b*measured(5) |
| Patch [6] | L*measured(6) | a*measured(6) | b*measured(6) |
| Patch [7] | L*measured(7) | a*measured(7) | b*measured(7) |
| Patch [8] | L*measured(8) | a*measured(8) | b*measured(8) |
| Patch [9] | L*measured(9) | a*measured(9) | b*measured(9) |
| Patch [10] | L*measured(10) | a*measured(10) | b*measured(10) |
| Patch [11] | L*measured(11) | a*measured(11) | b*measured(11) |
| Patch [12] | L*measured(12) | a*measured(12) | b*measured(12) |
| Patch [13] | L*measured(13) | a*measured(13) | b*measured(13) |
| Patch [14] | L*measured(14) | a*measured(14) | b*measured(14) |
| Patch [15] | L*measured(15) | a*measured(15) | b*measured(15) |
| Patch [16] | L*measured(16) | a*measured(16) | b*measured(16) |
| Patch [17] | L*measured(17) | a*measured(17) | b*measured(17) |
| Patch [18] | L*measured(18) | a*measured(18) | b*measured(18) |
| Patch [19] | L*measured(19) | a*measured(19) | b*measured(19) |
| Patch [20] | L*measured(20) | a*measured(20) | b*measured(20) |
| Patch [21] | L*measured(21) | a*measured(21) | b*measured(21) |
| Patch [22] | L*measured(22) | a*measured(22) | b*measured(22) |
| Patch [23] | L*measured(23) | a*measured(23) | b*measured(23) |
| Patch [24] | L*measured(24) | a*measured(24) | b*measured(24) |
| Patch [25] | L*measured(25) | a*measured(25) | b*measured(25) |
| Patch [26] | L*measured(26) | a*measured(26) | b*measured(26) |
| . | . | . | . |
| . | . | . | . |
| . | . | . | . |

$$\Delta E_n = \sqrt{\left(L^*_{target} - L^*_{measured}\right)^2 + \left(a^*_{target} - a^*_{measured}\right)^2 + \left(b^*_{target} - b^*_{measured}\right)^2}$$

$$\text{Color quality } (\Delta E) = \frac{\left(\sum_{n=0}^{m} \Delta E_n\right)}{m}$$

|  | Target color | | | Measured value | | | Color Quality |
|---|---|---|---|---|---|---|---|
|  | L* | a* | b* | L* | a* | b* | ΔE(n) |
| Patch [1] | L*target(1) | a*target(1) | b*target(1) | L*measured(1) | a*measured(1) | b*measured(1) | ΔE(1) |
| Patch [2] | L*target(2) | a*target(2) | b*target(2) | L*measured(2) | a*measured(2) | b*measured(2) | ΔE(2) |
| Patch [3] | L*target(3) | a*target(3) | b*target(3) | L*measured(3) | a*measured(3) | b*measured(3) | ΔE(3) |
| Patch [4] | L*target(4) | a*target(4) | b*target(4) | L*measured(4) | a*measured(4) | b*measured(4) | ΔE(4) |
| Patch [5] | L*target(5) | a*target(5) | b*target(5) | L*measured(5) | a*measured(5) | b*measured(5) | ΔE(5) |
| Patch [6] | L*target(6) | a*target(6) | b*target(6) | L*measured(6) | a*measured(6) | b*measured(6) | ΔE(6) |
| Patch [7] | L*target(7) | a*target(7) | b*target(7) | L*measured(7) | a*measured(7) | b*measured(7) | ΔE(7) |
| Patch [8] | L*target(8) | a*target(8) | b*target(8) | L*measured(8) | a*measured(8) | b*measured(8) | ΔE(8) |
| Patch [9] | L*target(9) | a*target(9) | b*target(9) | L*measured(9) | a*measured(9) | b*measured(9) | ΔE(9) |
| Patch [10] | L*target(10) | a*target(10) | b*target(10) | L*measured(10) | a*measured(10) | b*measured(10) | ΔE(10) |
| Patch [11] | L*target(11) | a*target(11) | b*target(11) | L*measured(11) | a*measured(11) | b*measured(11) | ΔE(11) |
| Patch [12] | L*target(12) | a*target(12) | b*target(12) | L*measured(12) | a*measured(12) | b*measured(12) | ΔE(12) |
| Patch [13] | L*target(13) | a*target(13) | b*target(13) | L*measured(13) | a*measured(13) | b*measured(13) | ΔE(13) |
| Patch [14] | L*target(14) | a*target(14) | b*target(14) | L*measured(14) | a*measured(14) | b*measured(14) | ΔE(14) |
| Patch [15] | L*target(15) | a*target(15) | b*target(15) | L*measured(15) | a*measured(15) | b*measured(15) | ΔE(15) |
| Patch [16] | L*target(16) | a*target(16) | b*target(16) | L*measured(16) | a*measured(16) | b*measured(16) | ΔE(16) |
| Patch [17] | L*target(17) | a*target(17) | b*target(17) | L*measured(17) | a*measured(17) | b*measured(17) | ΔE(17) |
| Patch [18] | L*target(18) | a*target(18) | b*target(18) | L*measured(18) | a*measured(18) | b*measured(18) | ΔE(18) |
| Patch [19] | L*target(19) | a*target(19) | b*target(19) | L*measured(19) | a*measured(19) | b*measured(19) | ΔE(19) |
| Patch [20] | L*target(20) | a*target(20) | b*target(20) | L*measured(20) | a*measured(20) | b*measured(20) | ΔE(20) |
| Patch [21] | L*target(21) | a*target(21) | b*target(21) | L*measured(21) | a*measured(21) | b*measured(21) | ΔE(21) |
| Patch [22] | L*target(22) | a*target(22) | b*target(22) | L*measured(22) | a*measured(22) | b*measured(22) | ΔE(22) |
| Patch [23] | L*target(23) | a*target(23) | b*target(23) | L*measured(23) | a*measured(23) | b*measured(23) | ΔE(23) |
| Patch [24] | L*target(24) | a*target(24) | b*target(24) | L*measured(24) | a*measured(24) | b*measured(24) | ΔE(24) |
| Patch [25] | L*target(25) | a*target(25) | b*target(25) | L*measured(25) | a*measured(25) | b*measured(25) | ΔE(25) |
| Patch [26] | L*target(26) | a*target(26) | b*target(26) | L*measured(26) | a*measured(26) | b*measured(26) | ΔE(26) |

Buyer Set-Up 2100

Default Setting (Static) 2110

| Preferences | Range |
|---|---|
| Price | $10 - $30 |
| Schedule | 2 - 3 days |
| Location | 10 to 20 Miles |
| Print Quality | Medium |

Time of Order Preference (Dynamic) 2120

| | Range |
|---|---|
| | $60 - $80 |
| | 3 Miles |
| | High |

Time of Order Finishing Capability 2130

| Cover Insert | Staple | Binding | Saddle Stitch | Perfect Bind | Ring Bind | Hole Punch | Duplex |
|---|---|---|---|---|---|---|---|
| YES | NO | NO | NO | YES | NO | NO | YES |

Time of Order Data 2140

| File | No. of Copies |
|---|---|
| Large_Job.jpg | 50 |

Target Measurement Data 2150

Target Measurement Data

Comment 2160

Blank schedule means use the default

FIG. 21

Seller Set-Up (2210)

| Engine Model | Engine Speed (PPM) | Resolution (DPI) | Finishing Capability (2220) | | | | | | | | | |
|---|---|---|---|---|---|---|---|---|---|---|---|---|
| | | | Cover Insert | Staple | Binding | Saddle Stitch | Perfect Bind | Ring Bind | Hole Punch | Duplex | Spectrophoto |
| Bizhub 1100 | 100 | 2400 | YES | YES | YES | YES | YES | YES | 3 | YES | YES |
| Bizhub 1085 | 85 | 1200 | NO | YES | NO | YES | NO | NO | 2 | NO | NO |

(2230)

| Price | Schedule |
|---|---|
| 10% | 6 hours |

METHOD TO DETERMINE THE BEST PRINTING DEVICE AMONGST A GROUP OF PRINTING DEVICES USING AN IN-LINE SPECTROPHOTOMETER

FIELD OF THE INVENTION

The present disclosure relates to a system and method for determining the best printing device amongst a group or plurality of printing devices, and more particularly to a system and method for determining the best printing device amongst a group or plurality of printing devices in a market place and/or print shop using an in-line spectrophotometer.

BACKGROUND OF THE INVENTION

In today's printing devices, a plurality of printing devices can, be available to a buyer or customer that can be used to print a customer's job in either an open market or a print shop. However, each of the plurality of printing devices may not be able to meet the customer's print quality requirements.

SUMMARY OF THE INVENTION

In consideration of the above issues, it would be desirable to have a method and system, which automatically determine the best printing device with the plurality of available printing devices using an in-line spectrophotometer or colorimeter.

A print management method implemented, in a system including a client computer, a server, and a plurality of printers is disclosed, comprising: by the server: (a) receiving, from a client computer, a request relating to a print job; (b) determining whether a predetermined print quality is required for the print job; (c) filtering at least two printers each, of which has an in-line spectrophotometer from the plurality of printers; (d) instructing the each filtered at least two printers to conduct a color validation process by using the in-line spectrophotometer; (e) receiving, from the each filtered at least two printers, a result corresponding to the color validation process by the in-line spectrophotometer; and (f) determining at least, one candidate of a destination printer for the print job based on whether the each filtered at least two printers meets predetermined print quality, using the result corresponding to the color validation process.

A print management method implemented in a system including a client computer, a server and a plurality of printers is disclosed, comprising: by the server: (a) receiving, from the client computer, a request relating to a print job; (b) determining whether a predetermined print quality is required for the print job; (c) determining at least two printers each of which has an in-line spectrophotometer from the plurality of printers; (d) instructing the each determined at least two printers to conduct a color validation process by using the in-line spectrophotometer; (e) receiving, from the each determined at least two printers, a result corresponding to the color validation process by the in-line spectrophotometer; and (f) determining at least one candidate of a destination printer for the print job based on whether the each determined at least two printers meets predetermined print quality, using the result corresponding to the color validation process.

It is to be understood that both, the foregoing general description and the following detailed description are exemplary and explanatory and are intended to provide further explanation of the invention as claimed.

BRIEF DESCRIPTION OF THE DRAWINGS

The accompanying, drawings are included to provide a further understanding of the invention, and are incorporated in and constitute a part of this specification. The drawings illustrate embodiments of the invention and together with the description serve to explain the principles of the invention.

FIG. 9 is an illustration of a chart showing target color data in accordance with an exemplary embodiment.

FIG. 10 is an illustration of a chart showing actual color data in accordance with an exemplary embodiment.

FIG. 11 is an illustration of a chart showing color quality in accordance with an exemplary embodiment.

FIG. 21 is an example of a buyer set-up in accordance with an exemplary embodiment.

FIG. 22 is an example of seller set-up in accordance with an exemplary embodiment.

FIG. 29 is a job chart illustrating saved job information and related data for a plurality of print jobs in accordance with an exemplary embodiment.

FIG. 30 is a chart illustrating saved data for a page of a print job in accordance with an exemplary embodiment.

DETAILED DESCRIPTION

Figure 1A:
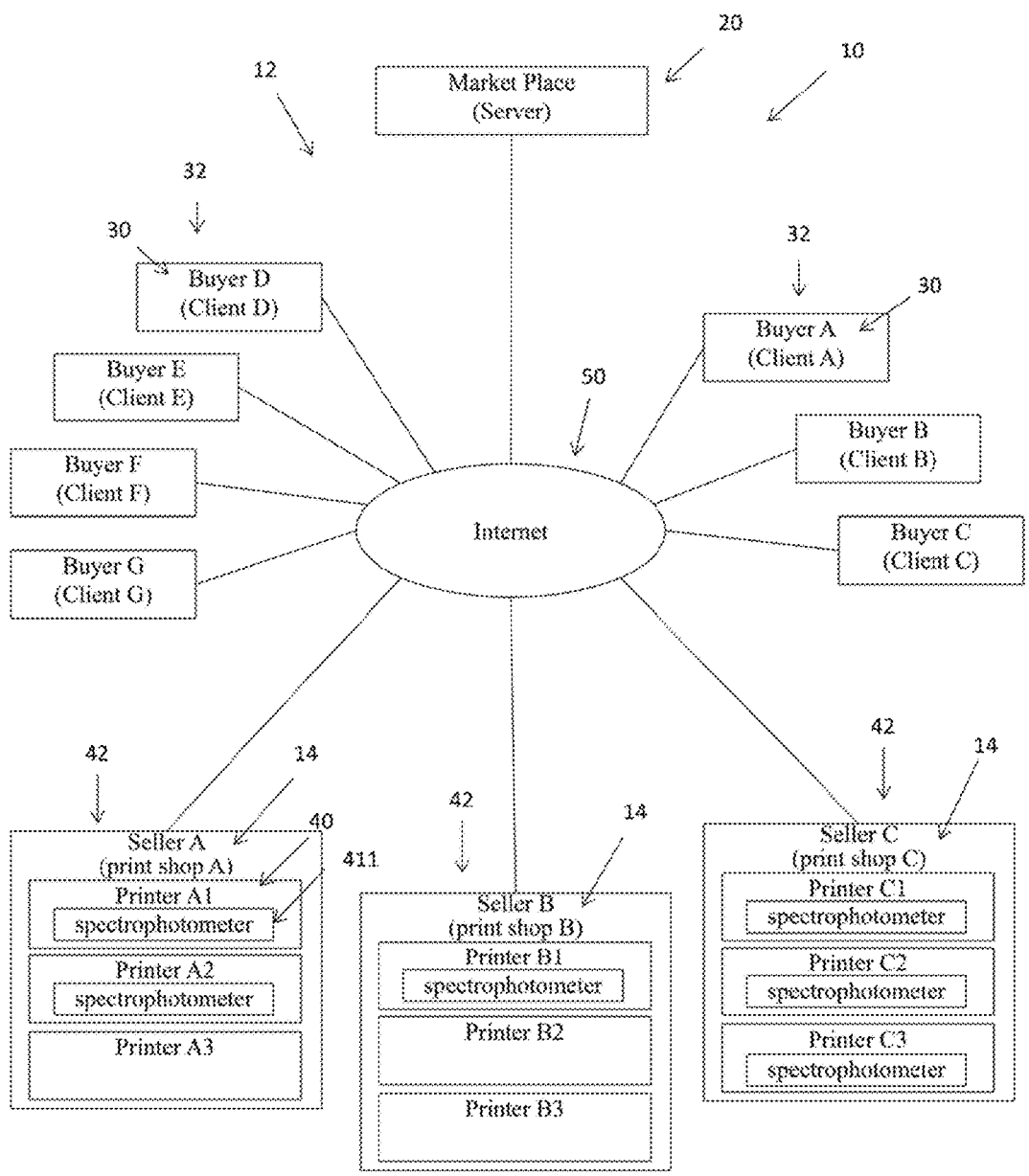
FIG. 1A is an illustration of an exemplary system for determining the best printing device amongst a group or plurality of printing devices using an in-line spectrophotometer in a marketplace setting in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Figure 4:
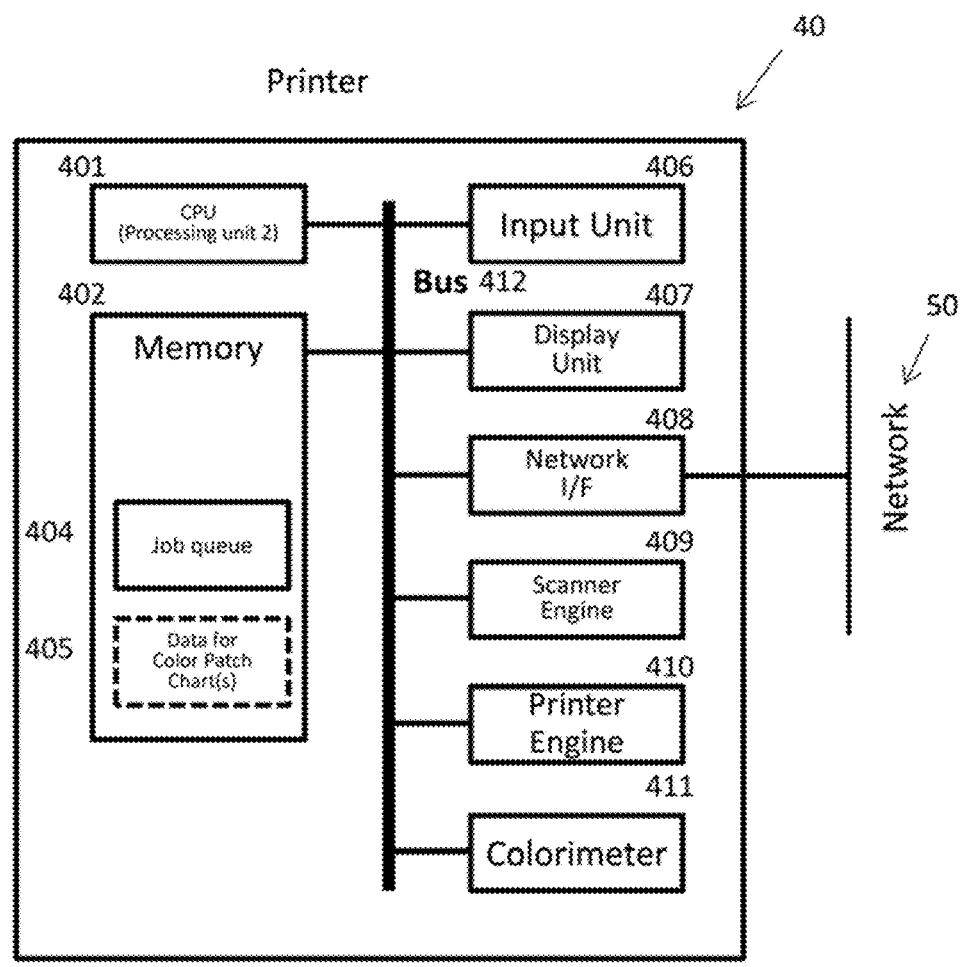
FIG. 4 is an illustration of printer or printing device in accordance with an exemplary embodiment.

FIG. 1A is an illustration of an exemplary system 10 for determining the best printing device amongst a group or plurality of printing devices 40 using an in-line spectrophotometer in a marketplace setting 12 in accordance with an exemplary embodiment. As shown in FIG. 1A, the system 10 can include at least one server 20 for the marketplace 12, one or more buyers or customers 32, each of the one or more buyers or customers having a client or client computer 30, and a plurality of printers or printing devices 40, which are connected, for example by a communication network (or network) 50. In accordance with an exemplary embodiment, the plurality of printers or printing devices 40 can be located within one or more print shops 14. Each of the one or more print shops 14 can house one or more printers or printing devices 40, and wherein at least one of the one more printers or, printing devices 40 in each of the one or more print shops 14 has a spectrophotometer (or colorimeter) 411 (FIG. 4).

In accordance with an exemplary embodiment, the one or more client computers 30 each include a display unit or graphical user interface (GUI), which can include a web browser 306, which provides access to a management program 202 on the server and designed to specifically bring together a customer (also referred to as the buyer) looking to have a print shop (also referred to as the seller) to print a specific job, whether its a book, a stapled document, instruction manuals, flyers, labels, etc. In accordance with an exemplary embodiment, the management program 202 can include a database of printers or printing devices 40. In addition, the management program can include a web portal, which is hosted on the at least one server 20. However, the web portal 202 can be hosted on one or more client computers 30 and/or on one or more printers 40, for example, within a print shop 14. The web portal is configured to receive information from one or more buyers 32 and sellers 42 or print shops 14 to execute print jobs as disclosed herein.

For example, in accordance with an exemplary embodiment, the system and method as disclosed herein is configured to bring together a buyer 32 looking for a product or service to purchase with a group of sellers selling such product or service. For example, the web portal can be specifically configured to sell printing service to potential customers. For example, in accordance with an exemplary embodiment, the selling of printing services can done through a bidding system where a buyer posts its printing requirements, and the software system (also referred to as the "Processing Unit 1") 201 as hosted, for example, on the server 20 (FIG. 2), can filter and choose the best 2 to 3 sellers 42 who are capable to delivering such printing services.

In accordance with an exemplary embodiment, after the potential sellers list has been narrowed down to two (2) to three (3) sellers, the Processing Unit 1 201 can commence a bidding system to give sellers the chance to set a price to do the print job. Once bidding has ended, the CPU (Processing Unit 1) 201 will present the results to the buyer 32 who will then choose the most appropriate seller 42 who can meet the customer's print job requirements. Thus, in accordance with an exemplary embodiment, the system and method as disclosed, can determine, for example, how to best filter the list of sellers down to 2 to 3 sellers to start the bidding. For example, if the buyer is requesting that the print job have a very high print quality, the CPU (Processing Unit 1) 201 on the server 20 can be configured to determine which sellers are able to provide a desired print quality. In accordance with an exemplary embodiment, for example, the desired print quality can be determined through the use an in-line spectrophotometer on one or more printers 40 within each of the one, or more print shops 42 wishing to bid on the job. For example, in, accordance with an exemplary embodiment, the high print quality can be a color quality exceeding a predetermined print quality target as calculated in a validation process or calibration process on one or more of the printing devices 40.

In accordance with an exemplary embodiment, in-line spectrophotometers 411 is a spectrophotometer that is included as part of the printing device 40. In accordance with an exemplary embodiment, the spectrophotometer 411 is preferably an in-line type that is attached to the printing device 40. In accordance with an exemplary embodiment, communications between the printing device 40 and the in-line spectrophotometer 411 is done seamlessly with little or no human intervention (for example, hand held devices require a human to manually scan the printed output using the handheld device in a manual fashion).

In accordance with an exemplary embodiment, the system and method as disclosed herein, can determine which printing device meets to print (for example, color) quality standards of the job, allows the Processing Unit 1 201 to make the determination in an automated fashion with little or no human intervention, and allows such determination to be done across a range of printing devices 40 that are connected in the network 50.

Figure 1B:
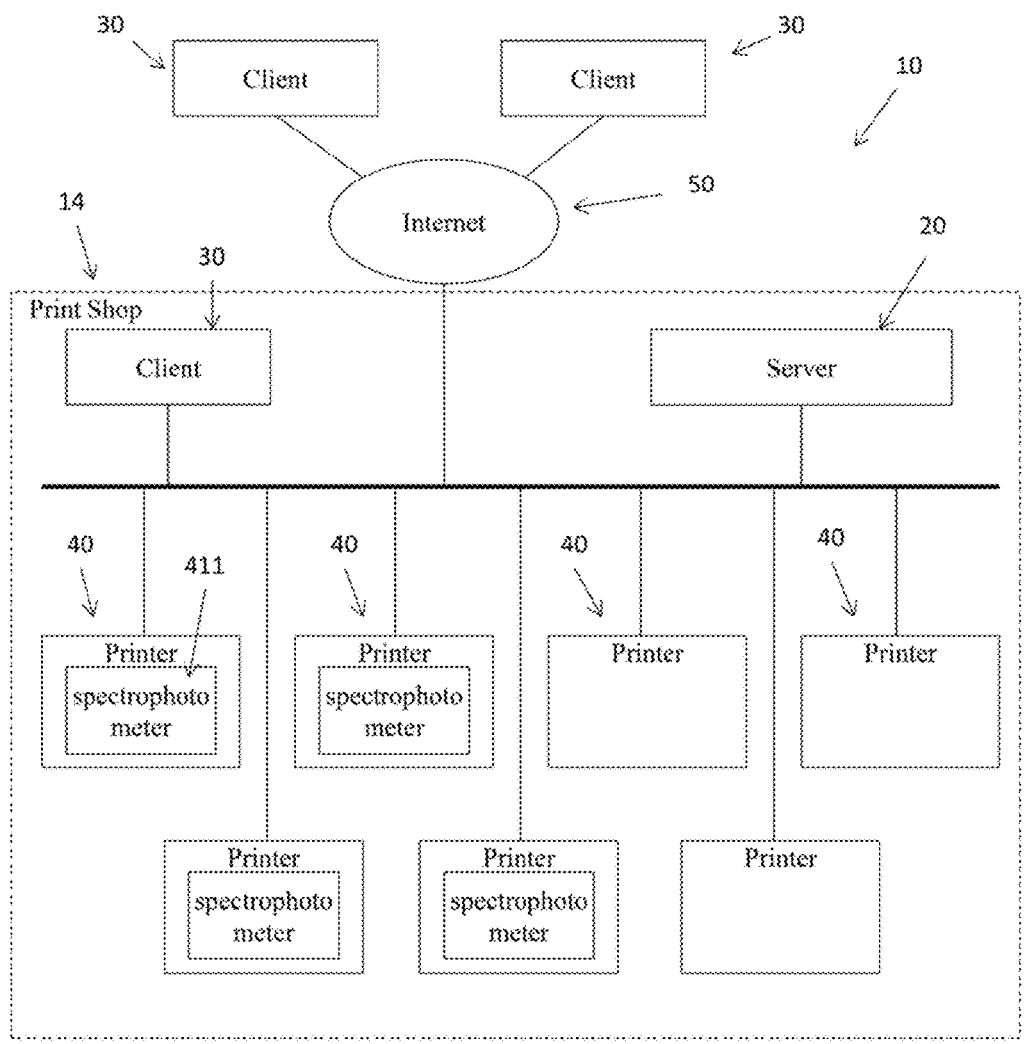
FIG. 1B is an illustration of an exemplary system for determining the best printing device amongst a group or plurality of printing devices using an in-line spectrophotometer in a print shop in accordance with an exemplary embodiment.

FIG. 1B is an illustration of an exemplary system 10 for determining the best printing device 40 amongst a group or plurality of printing devices 40 using an in-line spectrophotometer in a print shop 14 in accordance with an exemplary embodiment. As shown in FIG. 1B, the system 10 can include at least one server 20, one or more client or client computers 30, and a plurality of printers or printing devices 40, which are connected, for example by a communication network (or network) 50. In accordance with an exemplary embodiment, at least one of the one more printers or printing devices 40 has a spectrophotometer (or colorimeter) 411 (FIG. 4).

Figure 2:
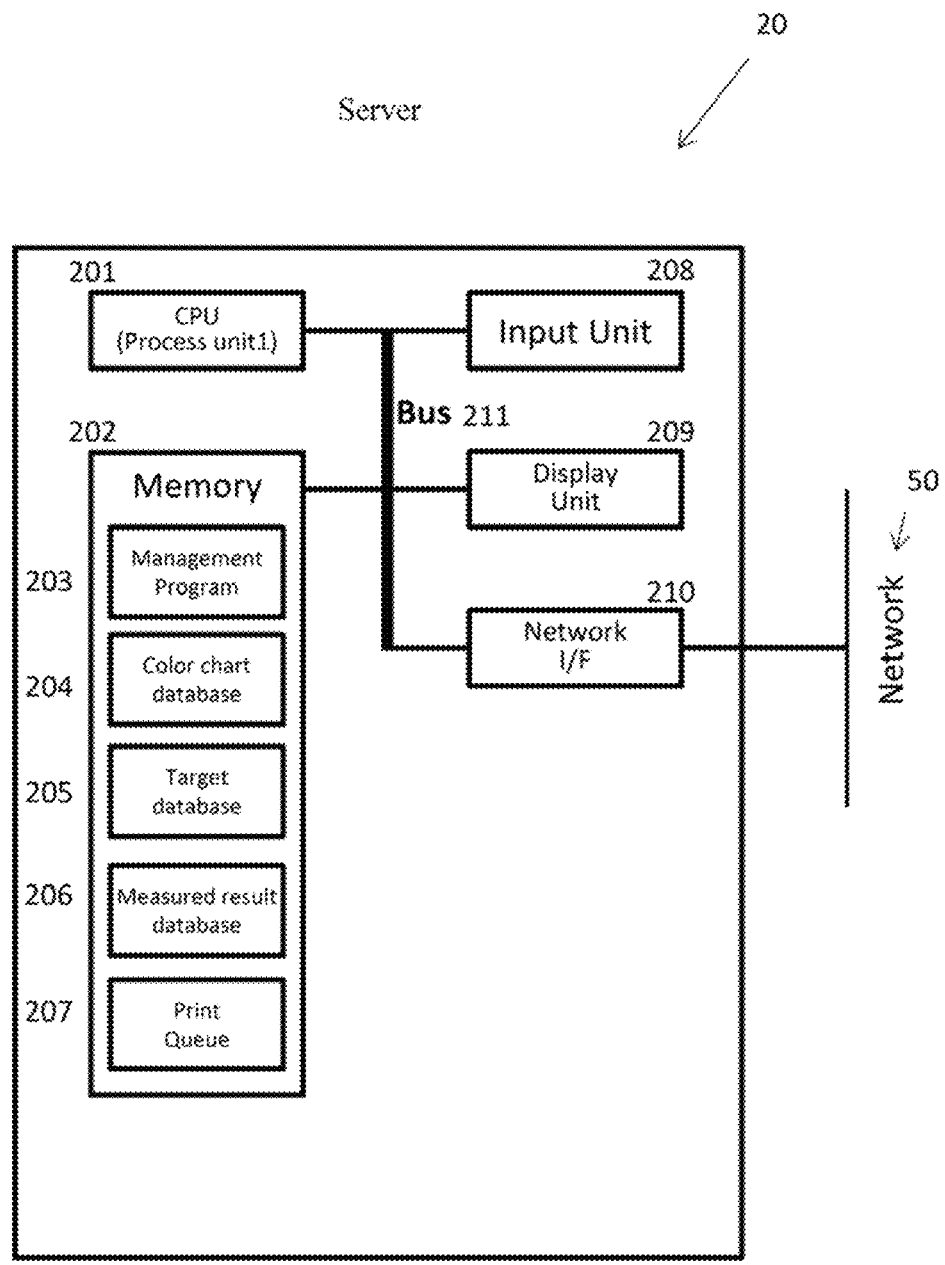
FIG. 2 is an illustration of a server in accordance with an exemplary embodiment.

FIG. 2 is an illustration of a server 20 in accordance with an exemplary embodiment. As shown in FIG. 2, the server 20 can include a processor or central processing unit (CPU) 201, and one or more memories 202 for storing software programs and data, which can include a management program (or web portal) 203, a color chart database 204, a target database 205, a measured result data base 206, and a print queue 207. The processor or CPU 201 carries, out the instructions of a computer program, which operates and/or controls at least a portion of the functionality of the server 20. The server 20 can also include an input unit 208, a display unit or graphical user interface (GUI) 209, and a network interface (I/F) 210, which is connected to a communication network (or network) 50. A bus 211 can connect the various components 201, 202, 208, 209, and 210 within server 20. The server 20 includes an operating system (OS), which manages the computer hardware and provides common services for efficient execution of various software programs as disclosed herein.

Figure 3:
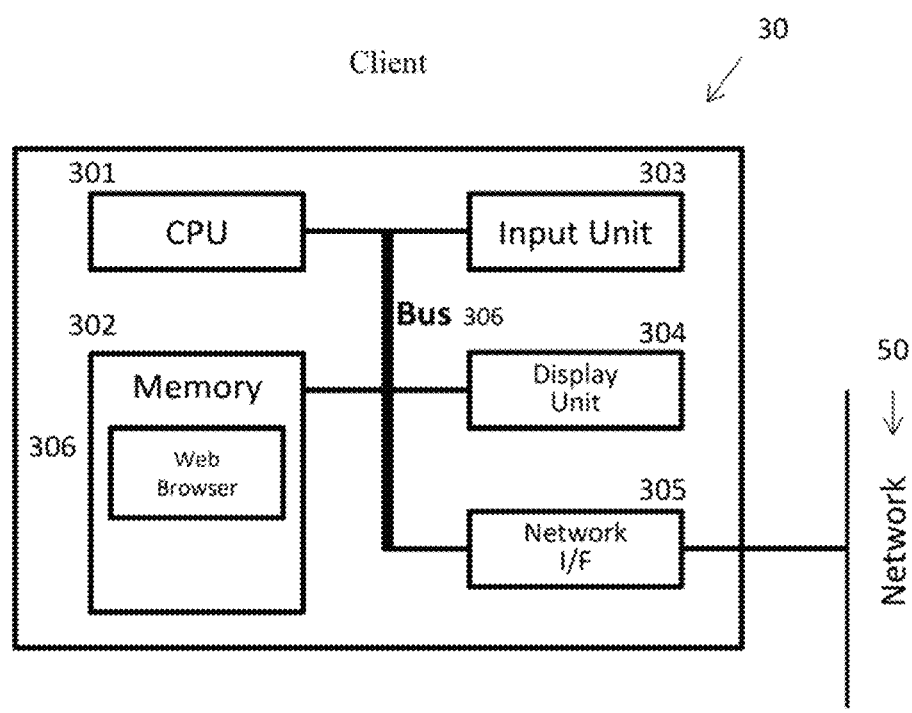
FIG. 3 is an illustration of a client or client computer in accordance with en exemplary embodiment.

FIG. 3 is an illustration of a client or client computer 3 in accordance with an exemplary embodiment. As shown in FIG. 3, the exemplary host computer or client computer 30 can include a processor or central processing unit (CPU) 301, and one or more memories 302 for storing software programs and data (such as files to be printed), and a printer driver. The printer driver of the client computer 30 is preferably a software application that converts data to be printed into a form specific for the printer 40. The processor or CPU 301 carries out the instructions of a computer program, which operates and/or controls at least a portion of the functionality of the client computer 30. The client computer 30 can also include an input unit 303, a display unit or graphical user interface (GUI) 304, and a network interface (I/F) 305, which is connected to a communication network (or network) 50. A bus 306 can connect the various components 301, 302, 303, 304, 305 within the client computer 30.

In accordance with an exemplary embodiment, the one or more client computers 30 each include a display unit or graphical user interface (GUI) 304, which can access the web browser 306 in the memory 302 of the client computer 30. The web browser 306 is configured to provides access to the web portal (or management program) 202 designed to specifically bring together a customer (also referred to as the buyer) looking to have a print shop (also referred to as the seller) to print a specific job, whether it's a book, a stapled document, instruction manuals, flyers, labels, etc. The web portal 202 is preferably hosted on the at least one server 20. However, the web portal 202 can be hosted on one or more client computers 30 and/o on one or more printers 40 within a print shop 14.

The client computer 30 includes an operating system (OS), which manages the computer hardware and provides common services for efficient execution of various software programs. The software programs can include, for example, application software and printer driver software. For example, the printer driver software controls a multifunction printer or printer 40, for example connected with the client computer 30 in which the printer driver software is installed via the communication network 50. In certain embodiments, the printer driver software can produce a print job and/or document based on an image and/or document data. In addition, the printer driver software can control transmission of the print job from the client computer 30 to the at least one server 20 and/or the printer or printing device 40.

FIG. 4 is an illustration of a printer or printing device 40, which can be referred to as an image forming apparatus in accordance with an exemplary embodiment. As shown in FIG. 4, the printer 40 can include a network interface (I/F) 408, which is connected to the communication network (or network) 50, a processor or central processing unit (CPU) 401, and one or more memories 402 for storing software programs and data (such as files to be printed). For example, the software programs can include a printer controller and a tray table. The processor or CPU 401 carries out the instructions of a computer program, which operates and/or controls at least a portion of the functionality of the printer 40. In accordance with an exemplary embodiment, the one or more memories 402 can include a job queue 404 and data for color patch chart(s) 405. The printer 40 can also include an input unit 406, a display unit or graphical user interface (GUI) 407, a network interface (I/F) 408, a scanner engine (or scanner) 409, a printer engine 410, and a colorimeter 411. In accordance with an exemplary embodiment, the printer 40 can be equipped with inline colorimeter (ICCU) (or spectrophotometer) 411, which measures printed color patches in order to generate color profiles.

In accordance with an exemplary embodiment, for example, the colorimeter (or spectrophotometer) 411 can be one or more color sensors or colorimeters, such as an RB scanner, a spectral scanner with a photo detector or other such sensing device known in the art, which can be embedded in the printed paper path, and an optional finishing apparatus or device (not shown). A bus 412 can connect the various components 401, 402, 404, 405, 406, 407, 408, 409, 410, 411 within the printer 40. The printer 40 also includes an operating system (OS), which manages the computer hardware and provides common services for efficient execution of various software programs. In accordance with an exemplary embodiment, it can be within the scope of the disclosure for the printer 40 to be a copier.

For example, in accordance with an exemplary embodiment, an image processing section within the printer 40 can carry out various image processing under the control of a print controller or CPU 401, and sends the processed print image data to the print engine 410. The image processing section can also include a scanner section (scanner 409) for optically reading a document, such as an image recognition system. The scanner section receives the image from the scanner 409 and converts the image into a digital image. The print engine 410 forms an image on a print media (or recording sheet) based on the image data sent from the image processing section. The central processing unit (CPU) (or processor) 401 and the memory 402 can include a program for RIP processing (Raster Image Processing), which is a process for converting print data included in a print job into Raster Image data to be used in the printer or print engine 410. The CPU 401 can include a printer controller configured to process the data and job information received from the one or more client computers 30, for example, received via the network connection unit and/or input/output section (I/O section) 408.

The CPU 401 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client computers 10 to generate a print image.

In accordance with an exemplary embodiment, the network I/F 408 performs data transfer with the at least one server 20 and the at least one client computer 30. The printer controller can be programmed to process data and control various other components of the multi-function peripheral to carry out the various methods described herein. In accordance with an exemplary embodiment, the operation of printer section commences when the printer section receives a page description from the at least one server 20 or the one or more client computers 30 via the network I/F 408 in the form of a print job data stream and/or fax data stream. The page description may be any kind of page description languages (PDLs), such, as PostScript® (PS), Printer Control Language (PCL), Portable Document Format (PDF), and/or XML Paper Specification (XPS). Examples of printers 40 consistent with exemplary embodiments of the disclosure include, but are not limited to, a multi-function peripheral (MFP), a laser beam printer (LBP), an LED printer, a multi-function laser beam printer including copy function.

Figure 5:
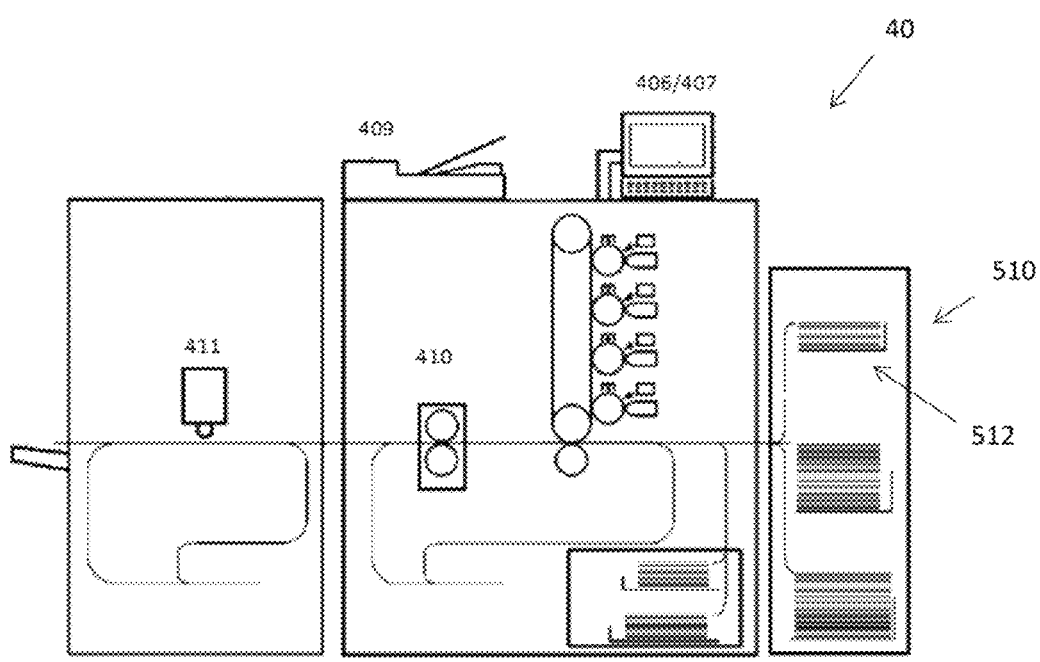
FIG. 5 is an illustration of an exterior of the printer or printing device as shown in FIG. 4.

FIG. 5 is an illustration of an exterior of the printer or printing device 40 as shown in FIG. 4. As shown in FIG. 5, the printer 40 can also include at least one auto tray or paper tray 510, and more preferably a plurality of auto trays or paper trays 510. Each auto tray or paper tray 510 can include a bin or tray, which holds a stack of a print media 512, for example, a paper or a paper-like product. The printer engine or print engine 410 has access to a print media 512 of various sizes and workflow for a print job, which can be, for example, stored in the input tray. A print job or "document" can be a set of related sheets, usually one or more collated copy sets copied from a set of original print job sheets or electronic document page images, from a particular user, or otherwise related.

In accordance with an exemplary embodiment, the color calibration of the at least one printer 40 as shown in FIGS. 4 and 5 can be performed by creating a color test pattern, for example, on the print controller of the CPU 401, which can be, for example, a Digital Front End (DFE) printer controller that can be set based on one or more print conditions, for example, after a specific number of print copies have been printed by the printing device or printer 40. With the calibration setting enabled, the color measurement pages can be printed, and the one or more printed color patches can be compared to a corresponding target color for each of the one or more printed color patches using the colorimeter 411. The color calibration patch compared to the target color (or target color data) can determine the color rendering performance of print engine of the printing device or printer 40 and/or generating a color profile as disclosed herein. In accordance with an exemplary embodiment, color profiles can include color gamut or color spaces and monochromatic or spectral colors.

In accordance with an exemplary embodiment, the print media 512 is preferably a paper or paper-like media having one or more print media attributes. The print media attributes can include, for example, paper color, coating, grain direction, printing technology, brightness, CIE, tint, whiteness, labColor, etc. In order to maximize print quality, the print media attributes of each type of print media should be input into or hosted on the printer 40, for example, on printer configuration settings of the printer 40 to obtain the highest quality output. Most print media 512 is provided in reams or other known quantities, which are packaged with indicia such as information on the manufacture, size, type and other attributes of the print media. In addition, most bundles or reams of paper include a UPC (Universal Product Code) or bar code, which identifies the type of print media including manufacture of the print media.

In accordance with an exemplary embodiment, the communication network or network 50 can be a public telecommunication line and/or a network (for example, LAN or WAN). Examples of the communication network 50 can include any telecommunication line and/or network consistent with embodiments of the disclosure including, but are not limited to, telecommunication or telephone lines, the Internet, an, intranet, a local area network (LAN) as shown, a wide area network (WAN) and/or a wireless connection using radio frequency (RF) and/or infrared (IR) transmission.

Figure 6:
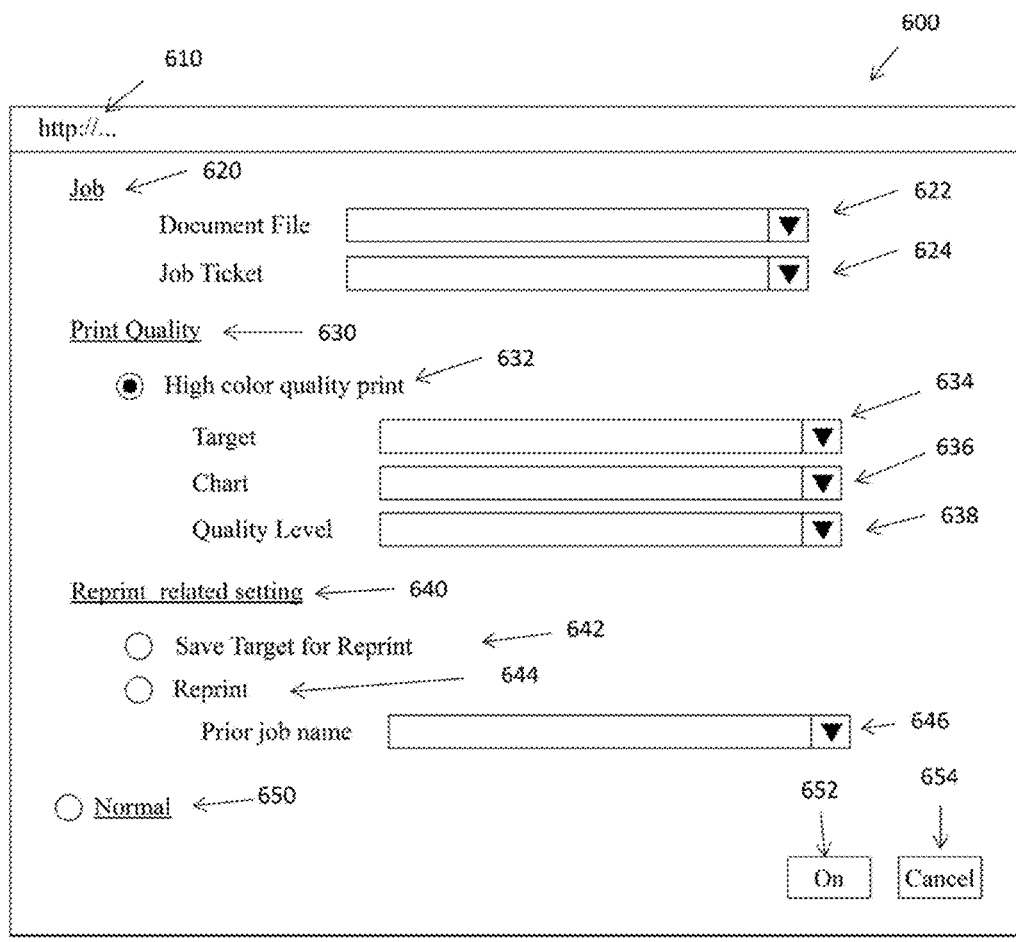
FIG. 6 is an illustration of a web page or a printer driver user interface on a display unit or a graphical user interface of a client computer for use with the system as shown in FIGS. 1A and 1B in accordance with an exemplary embodiment.

FIG. 6 is an illustration of a web page 600 on a display unit or a graphical user interface 304 of a client computer 30 for use with the system 10 as shown in FIGS. 1A and 1B in accordance with an exemplary embodiment. As shown in FIG. 6, the web page 600 is preferably provided by the server 20 from the web portal upon the customer accessing the management program (or web portal) 203 hosted on the server 20 through the web browser 306 on the client computer 30. The web page can include one or more pull down menus and/or check boxes, which can include an http address 610, and a plurality of pull down menus and/check boxes. The plurality of pull-down menus and/or check boxes can include one or more listings for a job identifier 620, print quality 630, a reprint related setting 640, a normal print setting 650, "ON" 652, and/or "Cancel" 654. The job identifier 620 can include pull-down menus, which relate, for example, to a document file (or file identifier) 622 and a job ticket 624. In accordance with an exemplary embodiment, the print quality 630 can include a high-quality print check box 632, and a plurality of pull-down menus (or drop-down menus) including target 634, chart 636, and quality level 638. The reprint related setting 640 can include a check box for "Save Target for Reprint" 642 and "Reprint" 844. In accordance with an exemplary embodiment, the "Reprint" 644 can be a pull-down menu for a prior job name 646. In accordance with an exemplary embodiment, the normal print setting 650 can be, for example, a check box.

In accordance with an exemplary embodiment, instead of a web page 600, for example, in a print shop environment as shown in FIG. 1B, the web page 600 can be a printer user interface having each of the pull-down menus and/or check boxes 620, as shown in FIG. 6. In addition, rather than determining the best printing device 40 amongst a group or plurality of printing devices 40 using an in-line spectrophotometer 411 with a server 20 as shown in FIG. 1A, the determination as disclosed herein can be performed on the client computer 30 and/or a server 20 within the print shop as shown in FIG. 1B.

Figure 7:
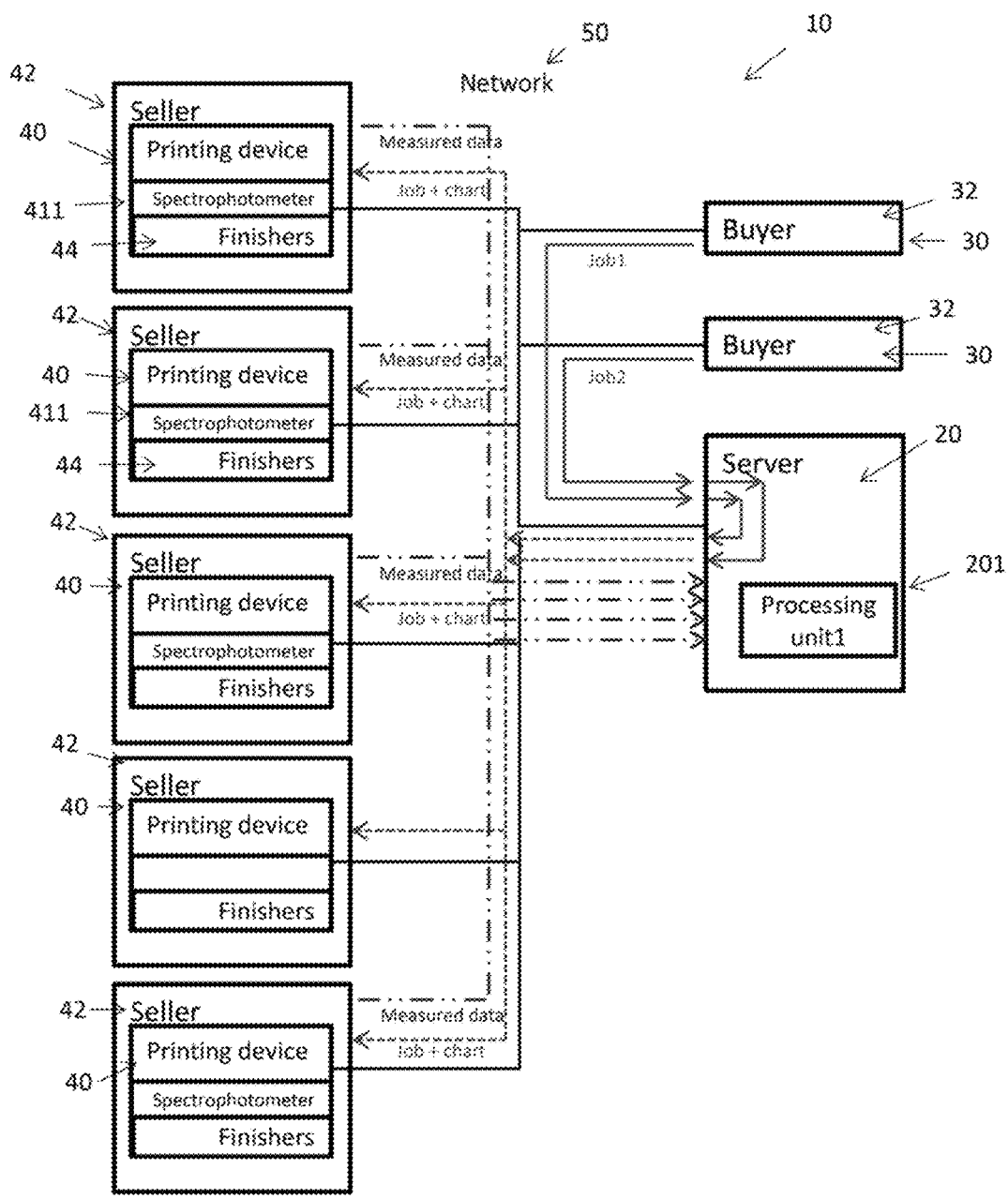
FIG. 7 is an illustration of the system for determining the best printing device amongst a group or a plurality of printers using a spectrophotometer as shown in FIGS. 1A and 1B, which can include the buyers and/or sellers, the printers, one or more finishers, and at least one spectrophotometer.

FIG. 7 is an illustration of the system 10 for determining the best printing device amongst a group or a plurality of printers 40 using a spectrophotometer 411 as shown in FIGS. 1A and 1B, which can include the buyers 32 and/or sellers 42, the printers 40, one or more finishers 44, and at least one spectrophotometer 411. As shown in FIG. 7, each of the one or more buyers 32 can send a print job (Job1, Job2) via a client computer 30 to the at least one server 20 over the communication network 50. The processing unit 201 of the at least one server 20 receives the print jobs (Job1, Job2) and forwards the print job (Job1, Job2) and a print quality chart 900 (FIG. 9) to the one or more printers 40 within the market place 12 and/or the print shop 14. Each of the one or more printers 40 within the market place 12 and/or the print shop 14 returns the measured data 1000 (FIG. 10) from the colorimeter (or spectrophotometer) 411 to the server 20, which can determine if one or more of the printers 40 within the market place 12 and/or the print shop 14 can meet the quality demand of each of the one or more buyers 32 for the print jobs (Job1, Job2). If one or more of the printers 40 can meet the quality demands of one or more buyers 32, the buyers 32 can be notified that one or more of the sellers 42 of the print services can meet their demand.

Figure 8:
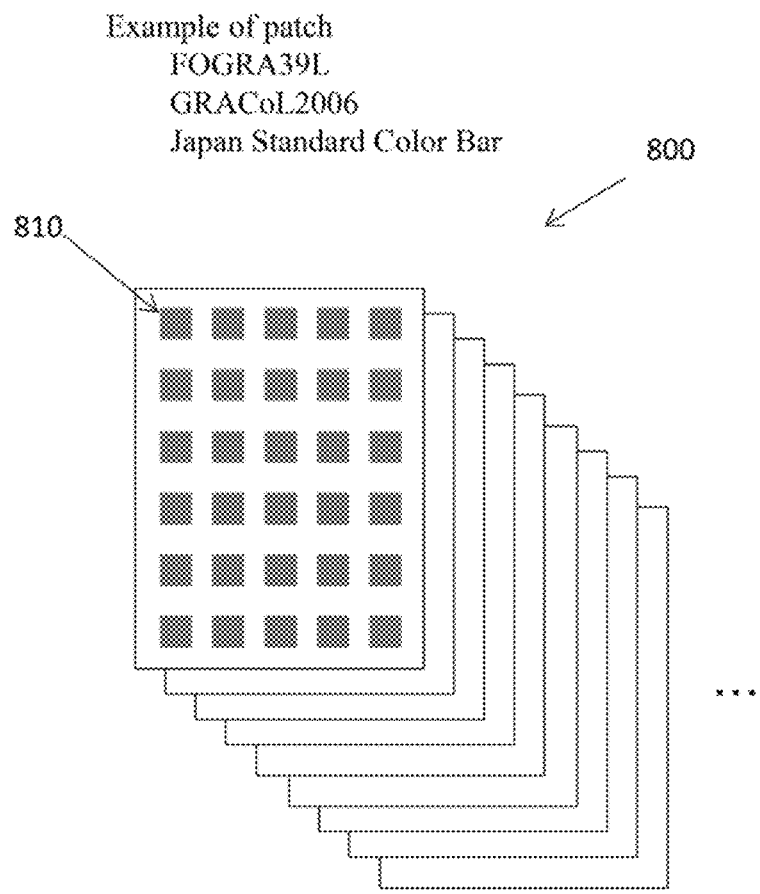
FIG. 8 an illustration of an exemplary color patch chart, which can be printed by the printer or printing device as shown in FIGS. 4 and 5.

FIG. 8 is an illustration of an exemplary color patch chart 800, which can be printed by the printer or printing device 40 as shown in FIGS. 4 and 5. As shown in FIG. 8, the printed color patch chart 800 can include a plurality of color patches (or validation print stripes) 810 printed on one or more sheets of a print media 512. As disclosed herein, the plurality of color patches are preferably read by the in-line spectrophotometer or colorimeter 411. The in-line spectrophotometer or colorimeter 411, for example, can be one or more inline color sensors (not shown), which are located in the paper path, and which feeds information to the CPU 401 for processing. The information received by the CPU (or processor) 401 from the in-line spectrophotometer or colorimeter 411 can be used to determine if one or more of the color patches 810 has failed, for example, at least one of the printed color patches 810 as read by the inline spectrophotometer or colorimeter 411 does not match a target color and/or the color quality is not within a desired target color data (or range).

In accordance with an exemplary embodiment, the target color can include, for example, a color gamut or gradient, such as Adobe RGB saturation, Adobe RGB perceptual, Adobe Wide-gamut RGB color space, etc. In accordance, with an exemplary embodiment, for each of the target colors, color gamut, and/or color gradients, a profile table is preferably hosted on the client computer 30. However, the profile table can also be hosted on the server 20 and/or the printer 40.

FIG. 9 is an illustration of a chart 900 showing target color data in accordance with an exemplary embodiment. As shown in FIG. 9, the target color data 900 can be expressed by a listing of each of the patches (n number of patches) and a corresponding color target. In accordance with an exemplary embodiment, the corresponding color target can be expressed in terms of L*target(n), a*target(n), b*target(n) for each of n number of patches.

FIG. 10 is an illustration of a chart showing actual color data 1000 in accordance with an exemplary embodiment. As shown in FIG. 10, the measured color data 1000 can be expressed by a listing of each of the patches (n number of patches) and corresponding measured data. In accordance with an exemplary embodiment, the corresponding measured data can be expressed in terms of L*measured(n), a*measured(n), b*measured(n) for each of n number of patches.

FIG. 11 is an illustration of a chart 1100 showing color quality in accordance with an exemplary embodiment. As shown in FIG. 11, the color quality of a printer 40, for example, can be calculated using the following formula:

$$\Delta E_n = \sqrt{((L*_{n\ target} - L*_{measured})^2 + (a*_{target} - a*_{measured})^2 + (b*_{target} - b*_{measured})^2)}$$

$$\text{Color quality}(\Delta E) = \frac{\left(\sum_{n=0}^{m} \Delta E_n\right)}{m}$$

Figure 12:
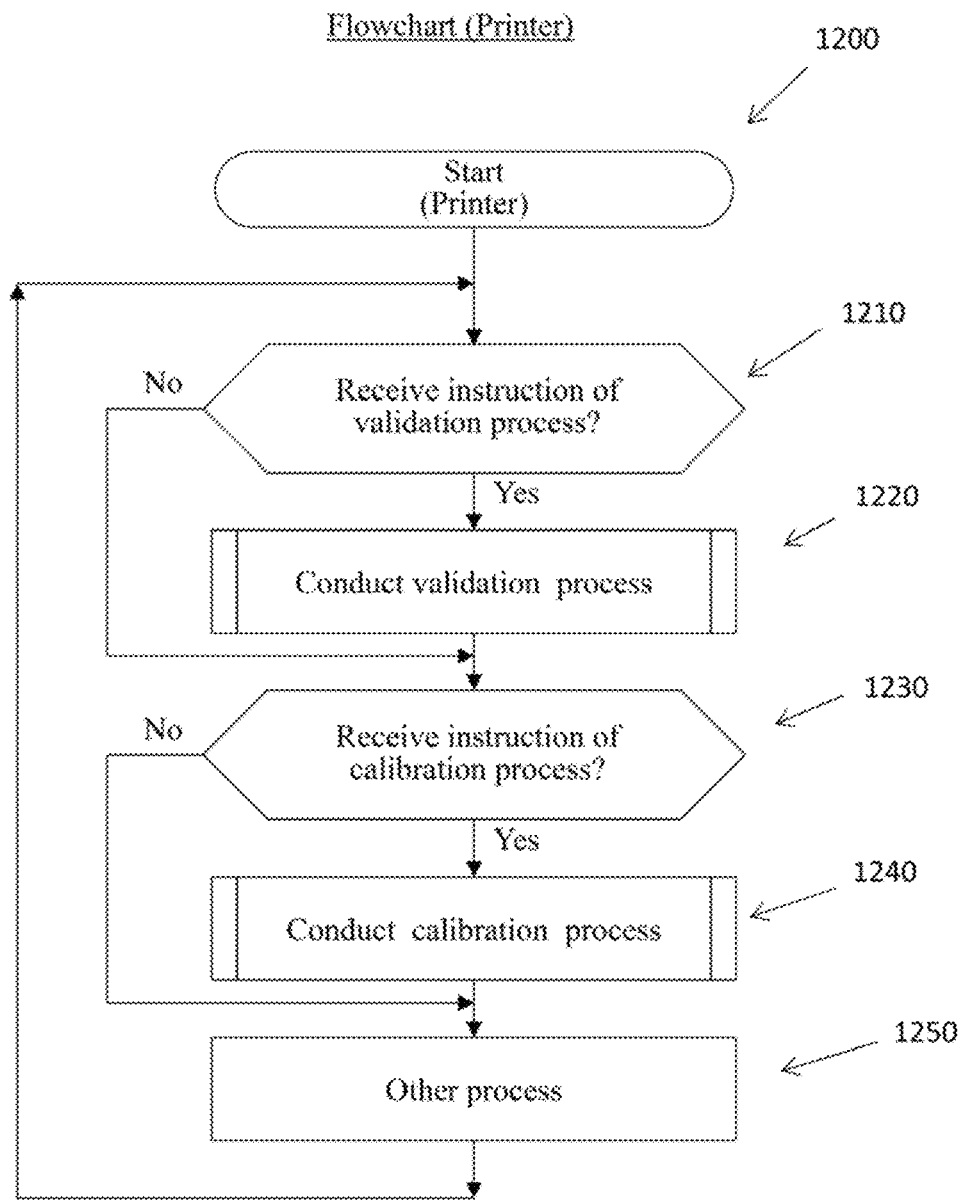
FIG. 12 is a flow chart illustrating a process executed on the printer or the printing device for determining the best printing device amongst a group or a plurality of printers using a spectrophotometer in accordance with an exemplary embodiment.

FIG. 12 is a flow chart 1200 illustrating a process executed on the printer or the printing device 40 for determining the best printing device amongst a group or a plurality of printers using a spectrophotometer in accordance with an exemplary embodiment. As shown in FIG. 12, in step 1210, the printer 40 determines if instructions have been received from the server 20 to conduct a validation process. If the printer receives instructions to conduct the validation process from the server 20, in step 1220, the printer conducts the validation process. The validation process can include printing a plurality of color patch chart(s) (or measurement sheets) 800 having a plurality of color patches (or calibration print stripes) 810. As disclosed herein, the plurality of color patches 810 on the color patch chart(s) (or measurement sheets) 800 are preferably read by the in-line spectrophotometer or colorimeter 411. The in-line spectrophotometer or colorimeter 411, for example, can be one or more inline color sensors (not shown), which are located in the paper path, and which feeds information to the CPU 401 for processing. The information received by the CPU (or processor) 401 from the in-line spectrophotometer or colorimeter 411 can be used to determine if one or more of the color patches 810 has failed, for example, at least one of the printed color patches 810 as read by the inline spectrophotometer or colorimeter 411 does not match a target color and/or the color quality is not within a desired target.

In accordance with an exemplary embodiment, in step 1230, the printer 40 can determine if instructions are received from the server 20 to conduct a calibration process. If the printer 40 receives instructions to conduct the color calibration process, in step 1240, the color calibration process is performed by the printer 40 based on the measured results and a target from the validation process. If, for example, the instructions do include a target, in step 1240, the color parameters of the printer 40 can be calculated and/or modified based on the measured data and a target sent from the server 20.

In accordance with an exemplary embodiment, if the printer 40 does not receive instructions from the server 20 to perform the validation process in step 1210, the process continues to step 1230. In addition, if the printer 40 does not receive instructions from the server 20 to perform the calibration process, the process continues to step 1250, in which additional and/or other processes can be performed. After step 1250, the process returns to step 1210.

Figure 13:
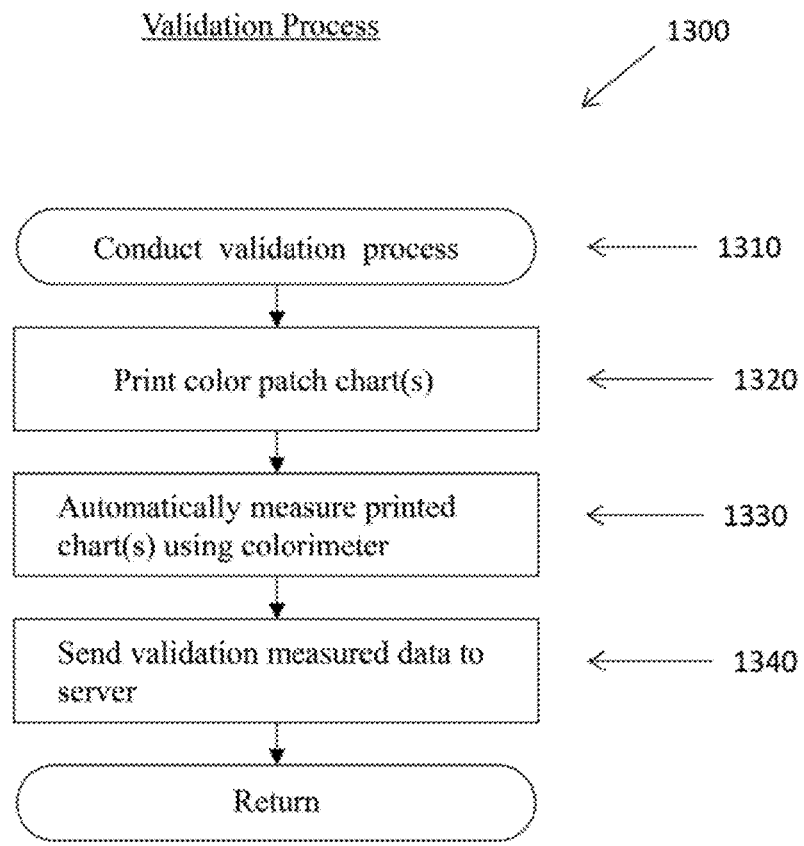
FIG. 13 is a flow chart illustrating a validation process executed on a printer or printing device according to an exemplary embodiment.

FIG. 13 is a flow chart illustrating a validation process executed on a printer or printing device 40 according to an exemplary embodiment. As shown in FIG. 13, the step of conducting the validation process in 1310 can include in step 1320, printing the color patch charts 800 as shown in FIG. 8. In step 1330, the printed color patches 810 on the printed color patch charts 800 can be automatically measured using the in-line spectrophotometer or colorimeter 411 on the printer or printing device. In step 1340, the measured validation data from the printed color charts 800 is send to the server 20 from printer 40.

Figure 14:
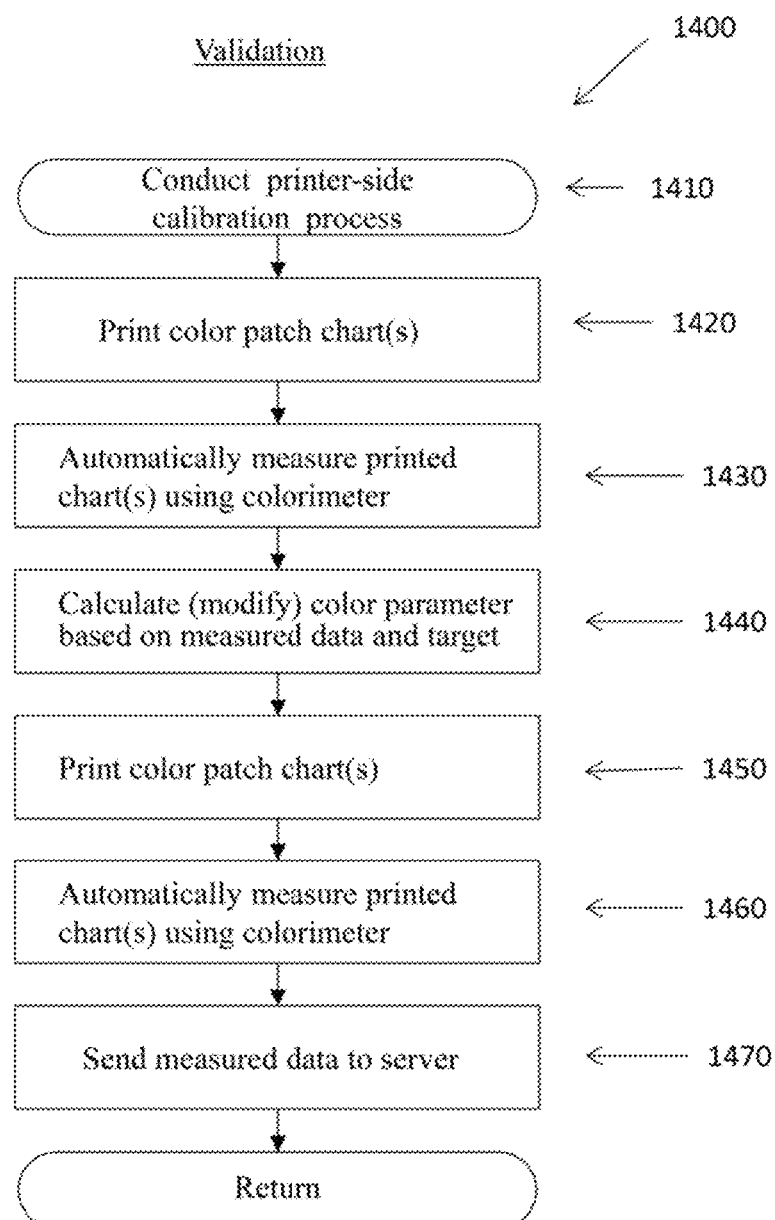
FIG. 14 is a flow chart illustrating a calibration process executed on a printer or printing device according to an exemplary embodiment.

FIG. 14 is a flow chart 1400 illustrating a calibration process 1410 executed on a printer or printing device 40 according to an exemplary embodiment. As shown in FIG. 14, the calibration process can include in step 1420, printing of the color patch chart(s) 800 by the printer 40. In step 1430 the printed color patch chart(s) 800 are automatically measured by the in-line spectrophotometer or colorimeter 411. In step 1440, the printer 40 calculates (or modifies) the color parameter of the printer 40 based on the measured results of the printed color patches 810 and a target color. In step 1450, the printer reprints the color patch chart(s) 800 after calculating (or modifying) the color parameters on the printer 40. In step 1460, the reprinted color patch chart(s) 800 are automatically measured by the in-line spectrophotometer or colorimeter 411, and the measured data is sent in to the server 20 from the printer 40 in step 1470.

Figure 15:
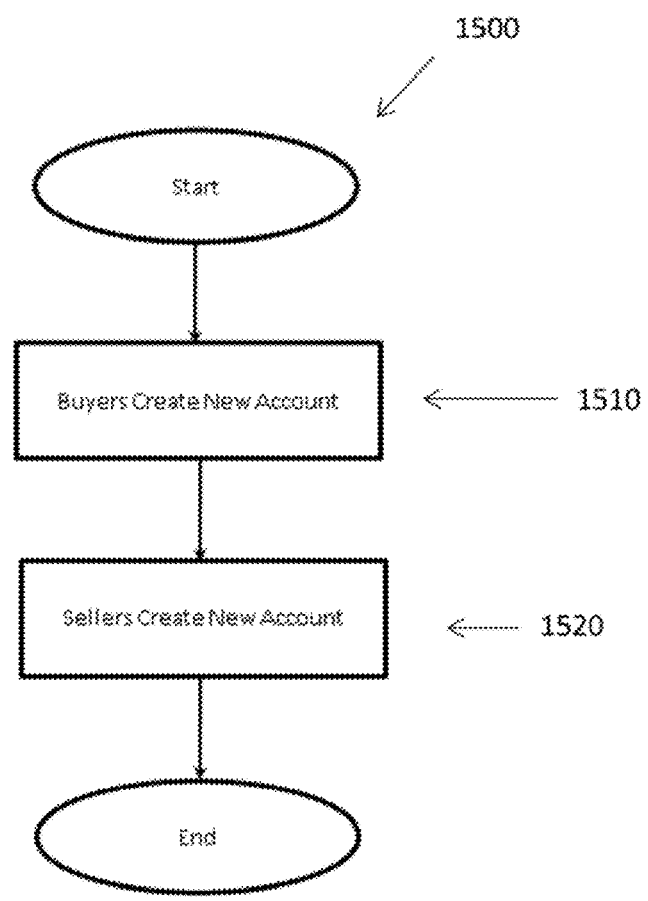
FIG. 15 is a flow chart illustrating a process for determining the best printing device amongst a group or a plurality of printers using a spectrophotometer in accordance with an exemplary embodiment.

FIG. 15 is a flow chart 1500 illustrating a process for determining the best printing device 40 amongst a group or a plurality of printers 40 using a spectrophotometer in accordance with an exemplary embodiment, for example, in a marketplace 12. As shown in FIG. 15, in step 1510, each of the one or more buyers 32 can create a new account on the web portal (or management program 202) hosted on the server 20. The new account for each of the buyers 32 can include information related to the identity of the buyer, for example, business name, address, contact information etc. In addition, in step 1520, each of the sellers 42 can create a new account on the web portal (or management program 202) hosted on the server 20. The new account for each of the sellers 42 can include information related to the identity of the seller, for example, business name, address, contact information, etc.

Figure 16:
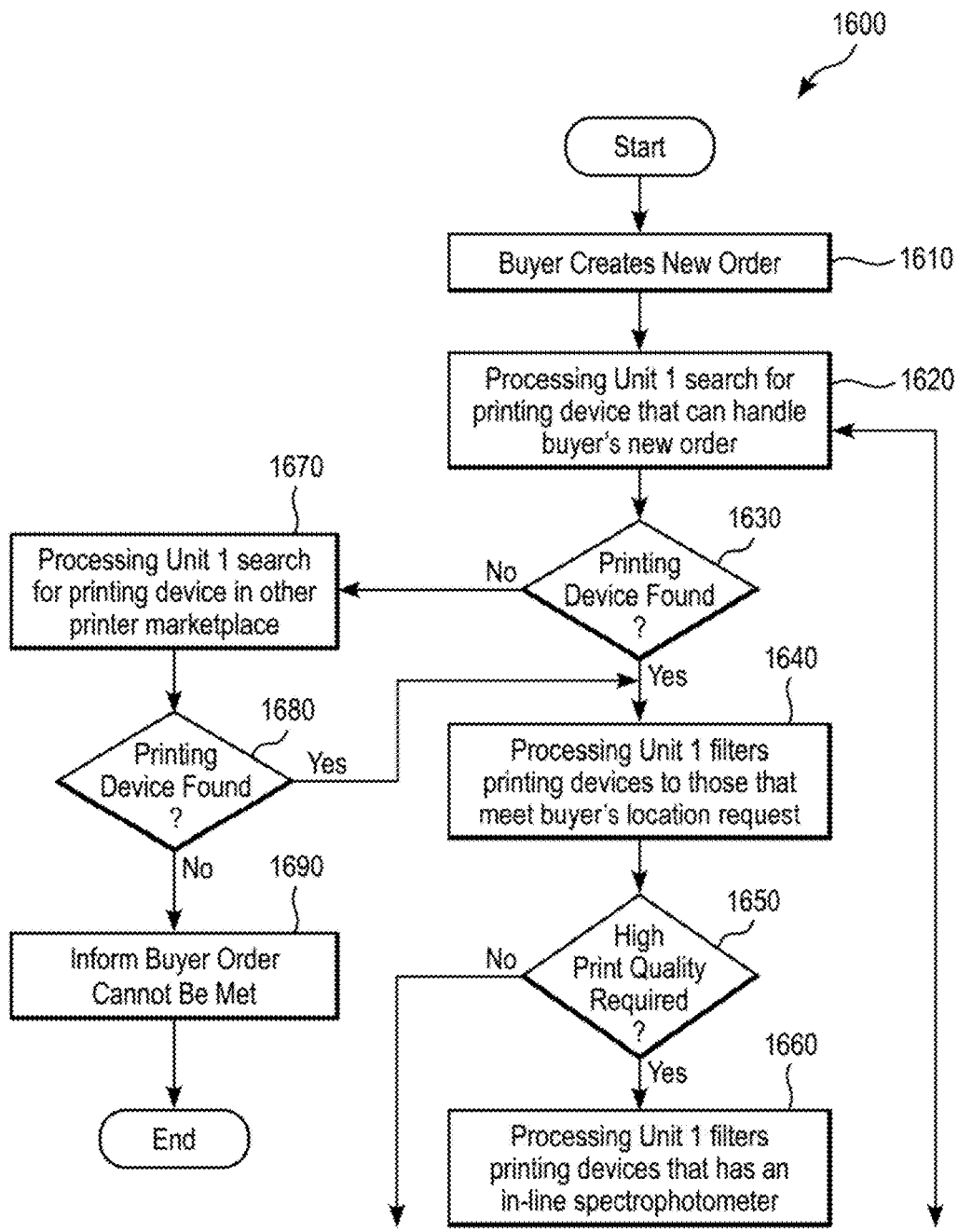
FIGS. 16 and 17 are flow charts illustrating a process for determining the best printing device amongst a group or a plurality of printers using a spectrophotometer in accordance with an exemplary embodiment.
Figure 17:
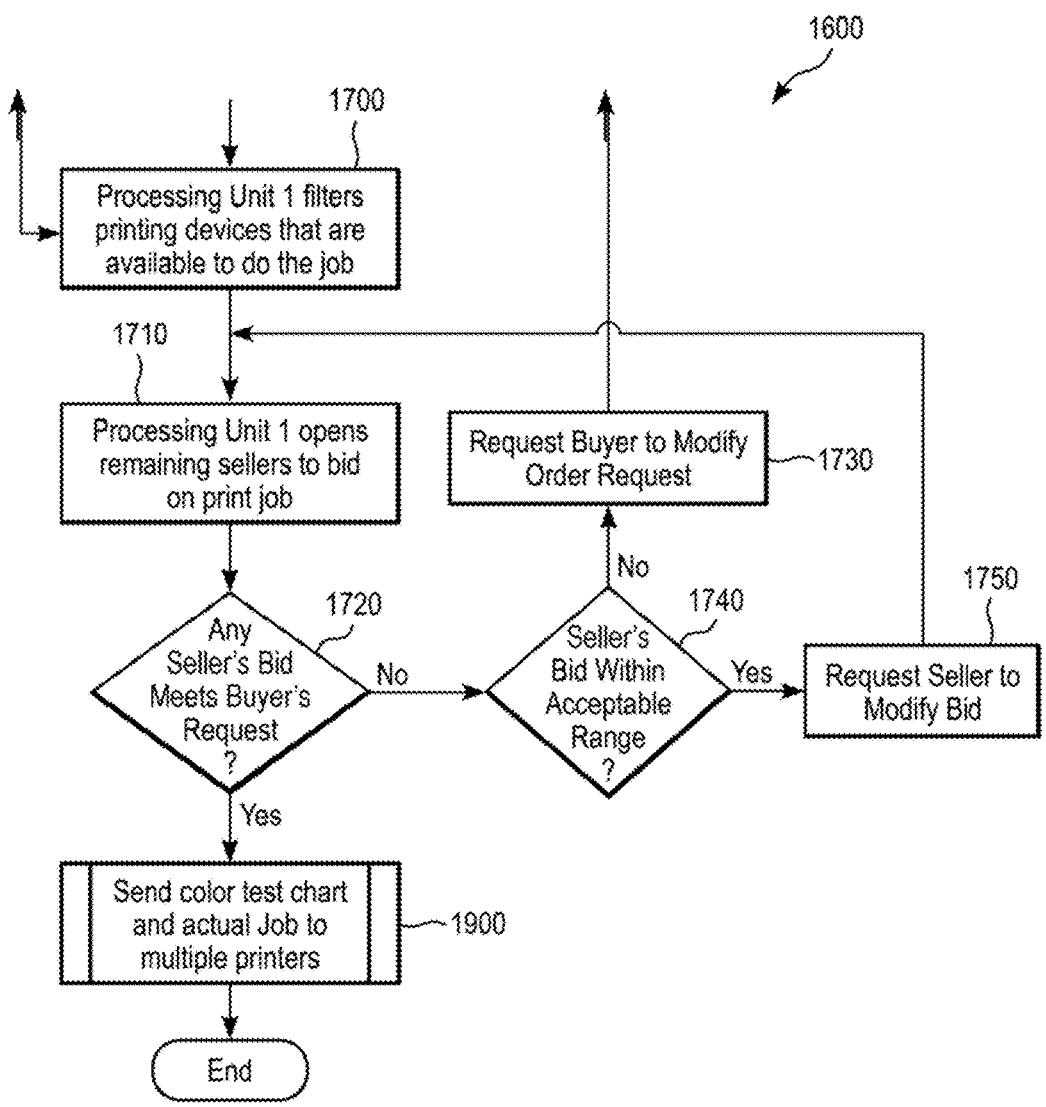

FIGS. 16 and 17 are flow charts 1600 illustrating a process for determining, the best printing device amongst a group or a plurality of printers using a spectrophotometer in accordance with an exemplary embodiment. As shown in FIGS. 16 and 17, in step 1610, the buyer creates a new order ("new order") for a print job, for example, as shown in FIG. 21, which is sent from the client or client computer 30 to the server 20. The new order can include, for example, default settings (static), for example, related to, price, schedule, location, and print quality. In addition, the new order can also include time of order preference (dynamic), time of order finishing capability, time of order date, time measurement date, and/or comments.

In accordance with an exemplary embodiment, in step 1620, the Processing unit 1 (or CPU) 201 on the server 20 searches for printing device (or printers) 40 that can handle the buyer's new order. In accordance with an exemplary embodiment, the server 20 will have a database of printers or printing devices 40, which can be searched. In accordance with an exemplary embodiment, the database of printers 40 can be stored in the management program 203 of the server 20. In step 1630, a determination is made if one or more printing devices 40 has been found that can execute the buyer's new order. If one or more printing devices 40 are found that can execute the buyer's new order, the process continues to step 1640, wherein the Processing Unit 1 201 of the server 20 filters (or determines) those printing devices 40 within the database of the server 20, which meet the buyer's location request. In step 1660, the Processing Unit 1 201 on the server 20 can make a determination, if the buyer's new request has a print quality requirement, for example, "High Print Quality". If the new order does not require a certain print quality (for example, "High Print Quality"), the process continues to step 1700, where the Processing Unit 1 201 filters (or identifies) printing devices 40 that are available to execute the print job.

In accordance with an exemplary embodiment, if the new order does have a print quality requirement, the process continues to step 1660, wherein the CPU 201 filters (or identifies) those printing devices 40 that has an-inline spectrophotometer (or colorimeter) 411 and then proceeds to step 1700, where the Processing Unit 1 201 filters the printing devices 40 that are available to execute the job. For example, as set forth, if the buyer has requested a desired print quality, for example, a "High Print Quality", the Processing Unit 1 201 will eliminate those printing devices 40 that do not have an in-line spectrophotometer 411. In addition, once the Processing Unit 1 201 has filtered or narrowed down the list of available printing devices 40, the Processing Unit 1 201 then searches for whether the printing device is available or not in step 1700. For example, a printing device 40 could have an in-line spectrophotometer 411, however, the printing device 40 could be down or offline, for example, because the printer 40 is waiting for parts and/or repairs. In accordance with an exemplary embodiment, step 1700 can be performed by querying the actual printing devices 40 (using, for example, Simple Network Management Protocol (SNMP protocol) and checking Management Information Base (MIB) value) to check for availability.

Figure 18:
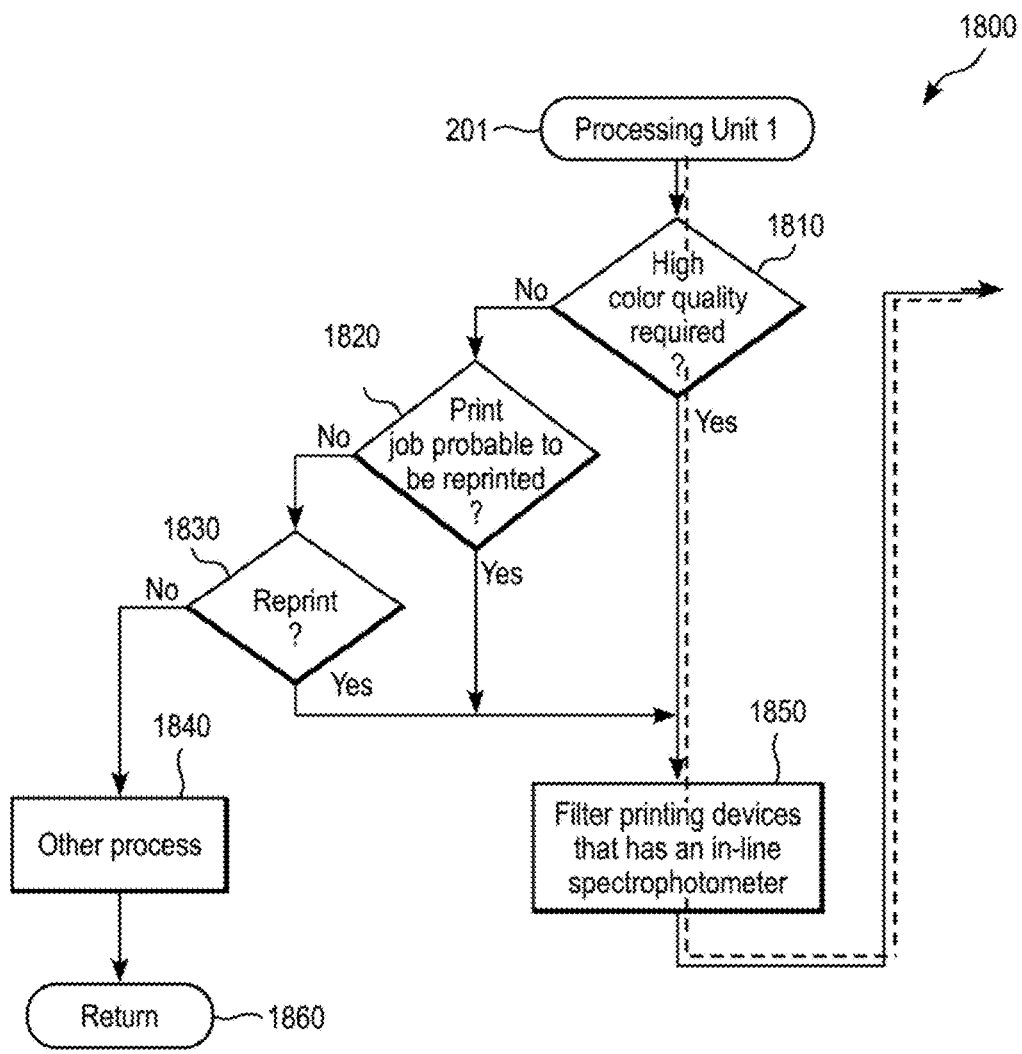
FIGS. 18-20 are flow charts illustrating a process for determining the best printing device amongst a group or a plurality of printers using a spectrophotometer in accordance with an exemplary embodiment.
Figure 19:
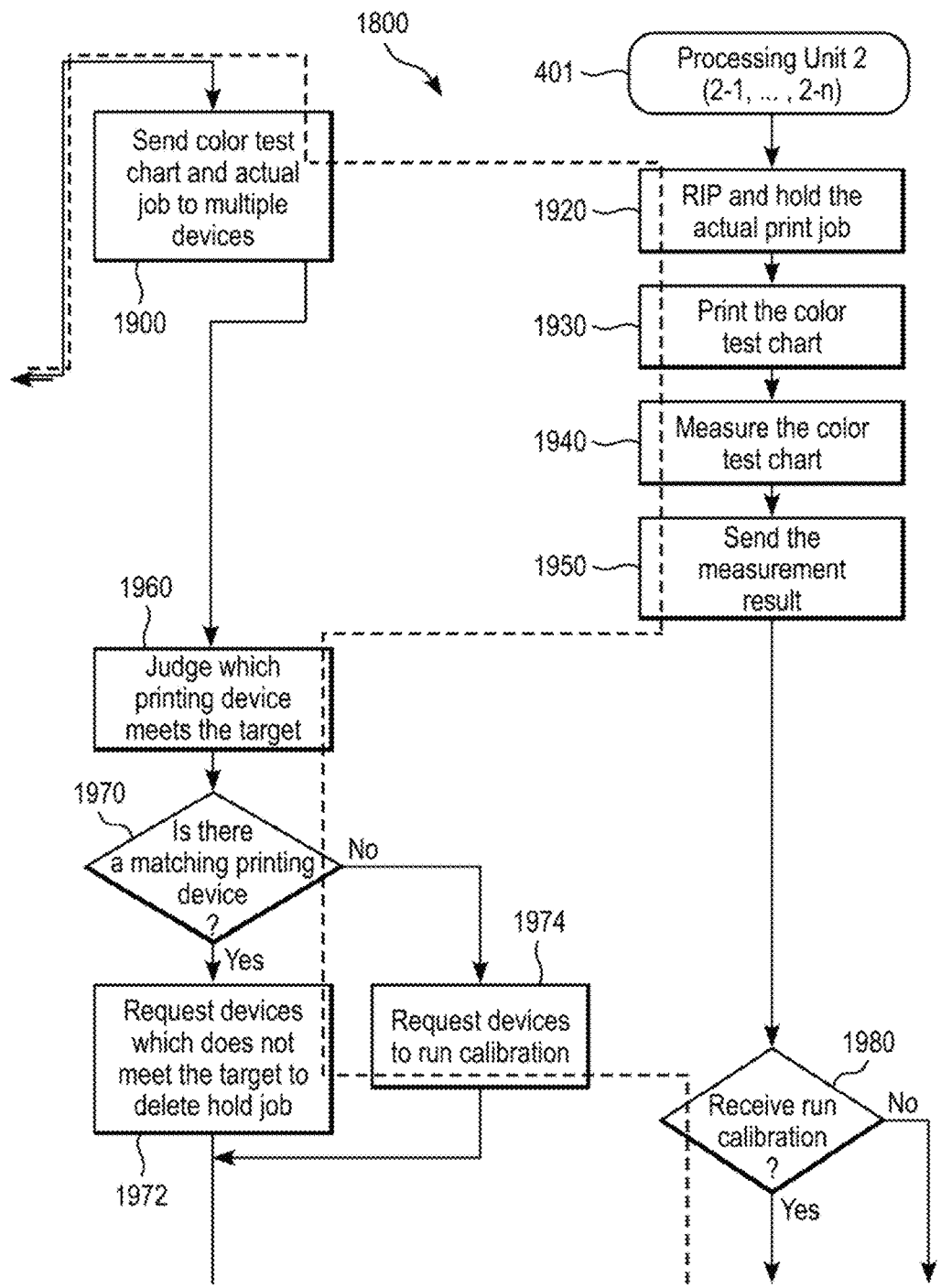
Figure 20:
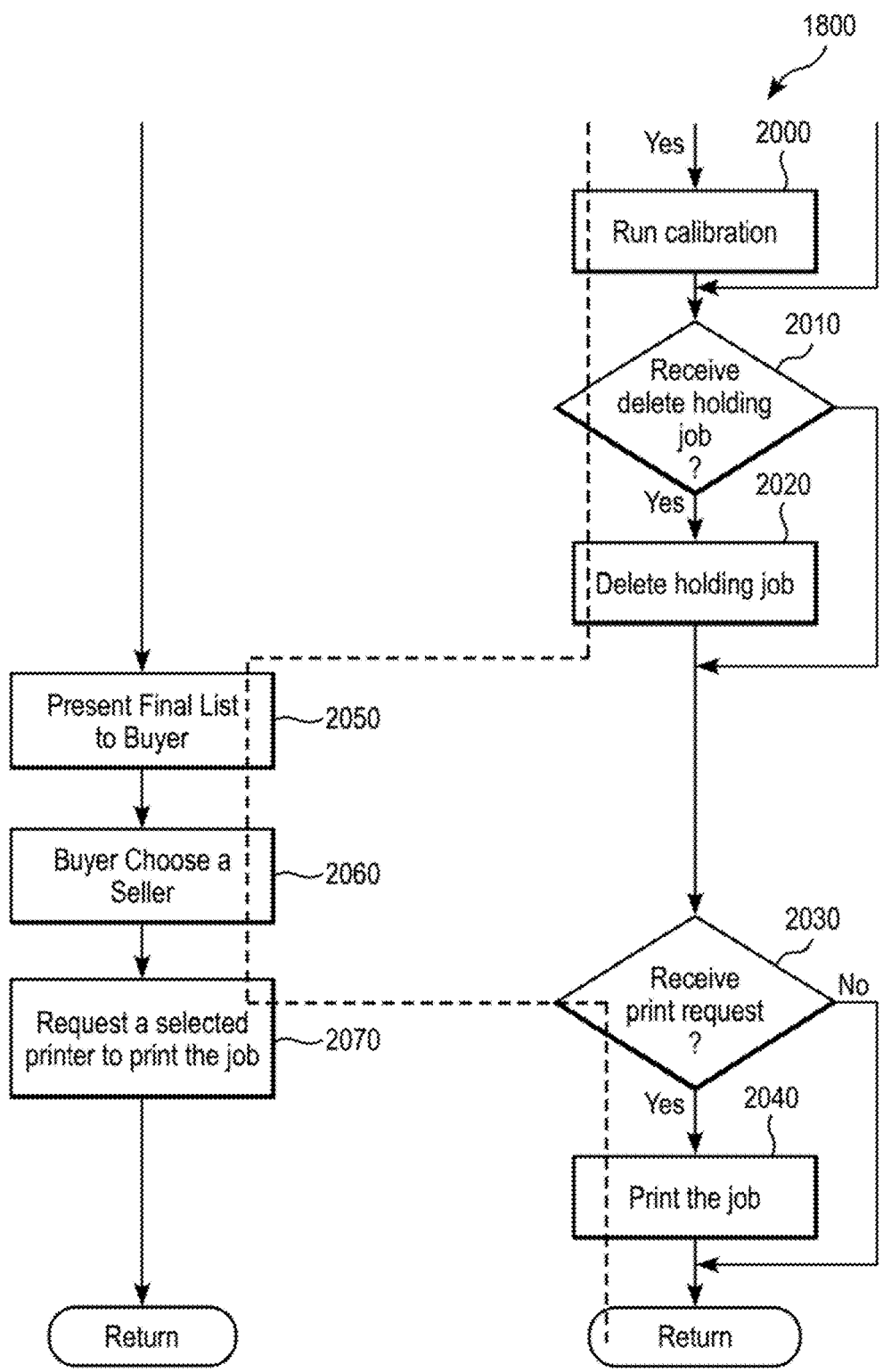

In accordance with an exemplary embodiment, once the Processing Unit 1 201 has identified or determined which printing devices 40 can perform the new order, in step 1710, the printing devices 40, which have been identified can bid on the new order. In step 1720, the Processing Unit 1 201 determines if any printing devices 40 meet the buyers request. As set forth, the next step is for the Processing Unit 1 to present to the remaining seller the job requirements (customer's price and schedule is not disclosed to seller). The seller will start to bid on this possible project. If in step 1720, one or more printing devices 40 meet the buyer's request, the process continues as shown in FIGS. 18-20.

However, if none of the seller's bids meet the buyer's request in step 1730, the process continues to step 1740, where a determination can be made if any of the bids are within an acceptable range. If none of the bids is, within an acceptable range, the process continues to step 1730, where a request can be made to the buyer to modify the order, and the process returns to step 1620. As set forth, if there are no sellers that meet the buyer's criteria for price and schedule, the Processing Unit 1 201 will request the buyer to adjust its parameters again like increase the price but keep schedule the same. The Processing Unit 1 201 can then go back to Step 1620 to re-do the search again.

Figure 24:
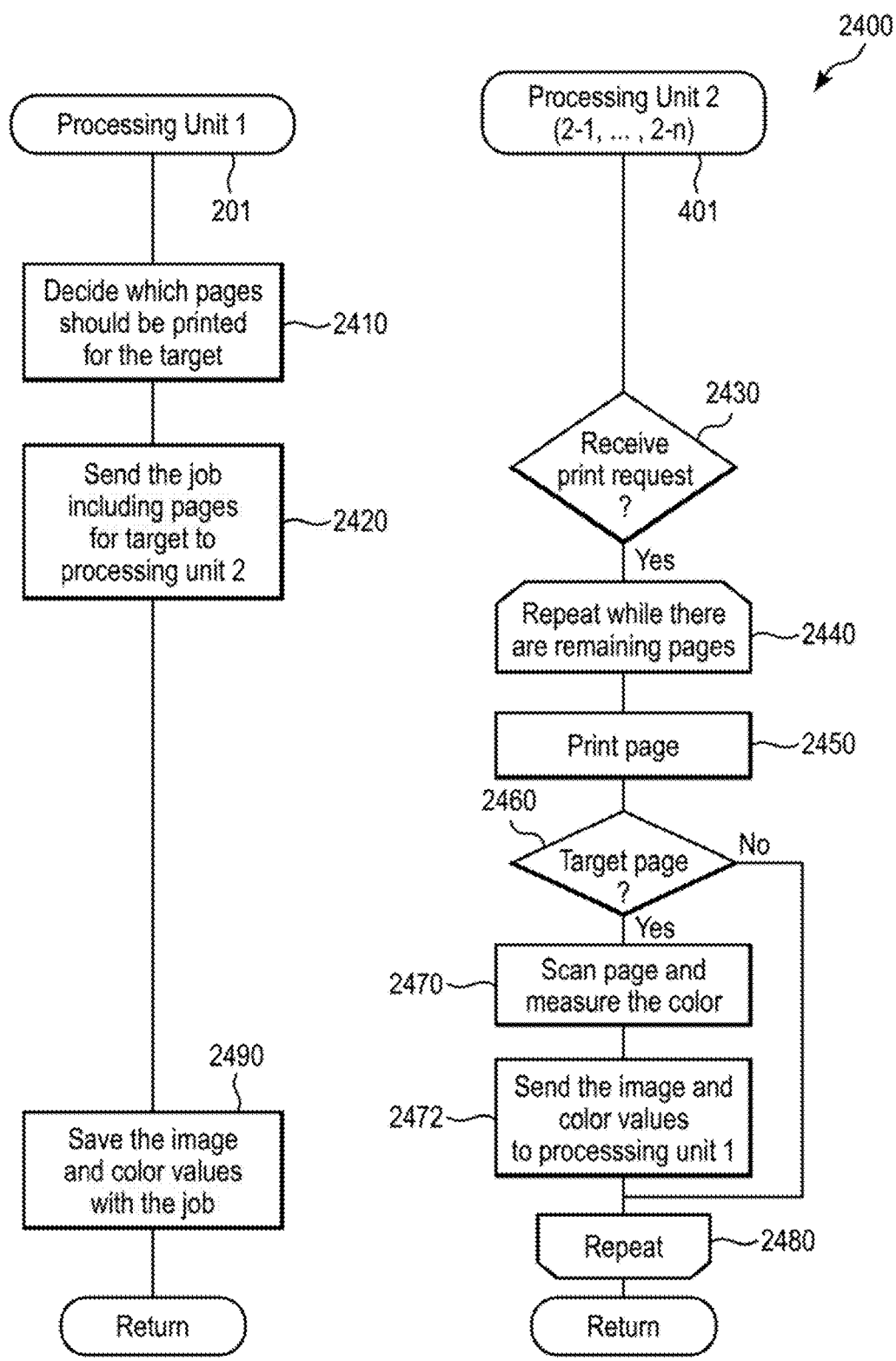
FIG. 24 is a flow chart showing a server and a printer illustrating a process for determining the best printing device amongst a group or plurality of printers using a spectrophotometer for a reprint job in accordance with another exemplary embodiment.

Alternatively, if one or more of the bids are within an acceptable range, the process continues to step 1740, where the seller is requested to modify the bid, and the process returns to step 1710. As set forth, if the buyer's price and schedule are within the range acceptable by the seller (but does not meet the buyer's schedule and price requirements) then the Processing Unit 1 201 can ask the seller to change their bid to meet the buyer's job request, for example, in the sellers set-up as shown in FIG. 24.

As set forth in step 1630, the Processing Unit 1 201 will then perform a search on ail the sellers (and corresponding printers or printing devices 40) in the server's database that can handle the buyers print job requirements. For example, in accordance with an exemplary embodiment, the server 20 can search each sellers printer device 40 in the database to see which one has the finisher configuration that can meet the buyers job request. If no printing device 40 is found, the process continues to step 1670 to search for printing devices in other printer markets. If printing devices 40, for example, can be found in other markets, the process continues to step 1640. However, if no printings devices can be found, in step 1690, the buyer can be informed that the new order cannot be met or filled, i.e., printed.

In accordance with an exemplary embodiment, for example, if no printing devices 40 are available that meet the job's color quality requirements, the system and method as disclosed herein can be configured to allow the Processing Unit 1 201 to go outside its network as set forth in step 1670 of FIG. 16 to query other printing devices in other network environments. As set forth in step 1640, for example, once one or more printing devices 40 have been found, the number of printing devices 40 on the list can be further narrowed down by checking the distance of the seller to the buyer and seeing, if this meets the buyers distance criteria as set forth in the buy set-up as shown, in FIG. 23.

FIGS. 18-20 are flow charts 1800 illustrating a process for determining the best printing device amongst a group or a plurality of printers using an in-line spectrophotometer or colorimeter in accordance with an exemplary embodiment. As shown in FIGS. 18-20, if the buyer has requested high print quality, the CPU (Processing Unit 1) 201 of the server 20 can perform a color verification process to check if the printing device 40 can meet the higher print quality standards. For example, in accordance with an exemplary embodiment, the Processing Unit 1 201 can perform this by sending to each of the printing devices 40 a color test chart file and the actual print job file to each of the printing devices. Each of the selected printing devices 40 will RIP (and HOLD) the actual print job. Since the RIP process can take a long time, the RIP process can be processed in parallel, with the printing of the color test chart, such that the validation and/or calibration of the printing devices 40 can be performed without waiting for the RIP process to finish.

In accordance with an exemplary embodiment, each of the selected printing devices 40 will print the color test chart. However, in accordance with an exemplary embodiment, the Processing Unit 1 201 can be configured such that based on certain criteria and/or business concerns, only a portion of the plurality of the selected printing devices 40 will print the color test chart. When the color test chart is printed, the in-line spectrophotometer 411 will start measuring the color chart. The measurement data is sent back to the Processing Unit 1 201. The Processing Unit 1 201 will judge, based on the measurement results, which printing device meets the target measurement data. The target measurement data is sent by the buyer 32 upon making the print job order. If the buyer 32 does not include the target measurement data, then the Processing Unit 1 can use a default target measurement data.

In accordance with an exemplary embodiment, if there are some, printing devices 40 that meet the target measurement data, the Processing Unit 1 201 can send a request to the printing devices 40, which do not meet the target to delete the holding job. In addition, a final list of the printing devices 40 (or at least the terms of the sellers 42) can be presented toile buyer(s) 32. The Processing Unit 2 401 on the printing devices 401, which receives the request to delete the hold job, can then delete the holding job. If there are no printing devices 40 that meet the target measurement data, the Processing Unit 1 201 will ask at least one or more of the printing devices to run a color calibration. After running the color calibration, the process repeats as disclosed herein and the printing of the color charts.

In accordance with an exemplary embodiment, in the case, for example, that this is a Reprint function, the target measurement data is coming from a previous good print job measurement data. Once the Processing Unit 1 201 obtains a final list of sellers, the Processing Unit 1 201 can present the final list of sellers to the buyer by way of a graphical interface using map application software in order for the buyer to easily visualize the distance of the seller from the buyer. If the buyer's request includes a request for high print quality, the Processing Unit 1 201 will display a preview of the printed job along with the location, price and schedule the seller can offer. Based on the price, schedule, print quality, and location presented to the buyer, the buyer can then choose from among the different sellers. In accordance with an exemplary embodiment, the Processing Unit 1 sends the request to the Processing Unit 2 401 of the selected printing device 40 for printing of the print job.

In accordance with an exemplary embodiment, the detailed steps of the process as disclosed above is shown in FIGS. 18-20, and further described below. Initially, in step 1810 of FIG. 18, the Processing Unit 1 201 receives the new order (or print job) from the client 30 and determines if the print job requires a "High Color Quality". If the print job does not require a "High Color Quantity", the process continues to step 1820, where a determination is made, if the print job is probable to be reprinted, for example, the user has selected "Save Target for Reprint" 642 on the GUI 600. If the print job is not probable to be reprinted, for example, the user has not selected "Save Target for Reprint", the process continues to step 1830, where it is determined, if the print job is a print job, which is to be reprinted, for example, a print job previously printed and saved in a memory of the server 20 and/or a printing device (or printer) 40. In accordance with an exemplary embodiment, for example, the "Reprint" function can determine that the CPU (or Processing Unit 1) 201 does not have to request the printing device 40 to print the test chart each time, especially, for example, if the printing device 40 has recently run a calibration job. If the print job is not a reprint, the process continues to step 1840, wherein the print job can be printed and/or undergo another process.

In accordance with an exemplary embodiment, if the print job is a probable for a reprinting, for example, the user is more likely than not or at least a 50% chance of being reprinted, and the user has selected. "Save Target for Reprint" 642, the process continues to step 1850, where the Processing Unit 1 executes a process by filtering those printing devices 40 that have an in-line spectrophotometer 411 from those printing devices 40, which do not have an in-line spectrophotometer 411. At this step, those printing devices 40, which do not have an in-line spectrophotometer (or colorimeter) 411 are discarded, and no longer considered. In step 1900, the Processing Unit 1 201 sends a color test chart and an actual job (for example, a print job) to a plurality of printing devices 40. In step 1920, the Processing Unit 2 401 of each of the plurality of printing devices 40 can begin the RIP process and holding (or storing) of the actual print job. In step 1930, each of the plurality of printing devices prints the color test chart 800 as disclosed herein. In step 1940, each of the plurality of printing devices 40 measures the color test chart and in step 1950 each of the plurality of printing devices 40 sends the measured results to the Processing Unit 1 201.

In accordance with an exemplary embodiment, in step 1960, the Processing Unit 1 201 receives the measured results from the printing devices 40 in step 1950, and judges, which printing devices of the plurality of printing devices 40 meets a color print target. In step 1970, the process determines if any of the plurality of printing devices 40 have met the color print target. In step 1972, for those printing devices 40, which do not meet the color print target, those devices are instructed to delete the hold job. Alternatively, in accordance with an exemplary embodiment, if a printing device receives instructions in step 1980, at least some of the one or more printing devices 40 can be instructed to run a calibration in step 2000.

In step 1970, if none of the printing devices 40 meet the color target, in step 1974, at least some of the plurality of printing devices can, be requested to run a color calibration.

In accordance with an exemplary embodiment, in step 980, each of the printing devices 40 may receive an instruction to run or perform a color calibration. If the printing device 40 does not receive an instruction to run a color calibration, the process continues to step 2010, where the printing device 40 may receive an instruction to delete the hold job. If the printing device 40 receives the instruction to delete the hold job, the process continues to step 2020, in which the printing device 40 will delete the hold job.

Alternatively, if the printing device 40 receives an instruction to run a color calibration in step 1980, in step 2000, the printing device 40 will run a color calibration. The process continues to step 2010, where the printing device 40 may receive an instruction to delete the hold job. If the printing device receives the instruction to delete the hold job, the process continues to step 2020, in which the printing device will delete the hold job.

In accordance with an exemplary embodiment, in step 2050, those printing devices 40 meeting the target color are presented to the buyer. In step 2060, the buyer can choose a seller from the list of printing devices 40 (or sellers 42), which are candidates for the print job. In step '2070, if a seller 42 is selected by the buyer 32, instructions can be sent to a selected printing device 40, i.e., destination printer or printing device 40 to print the job.

In accordance with an exemplary embodiment, in step 2030, a determination can be made for each of the one or more printing devices 40, if a print request is received. If the printing device 40 receives instructions to print the hold job (or print job), in step 2040, the print job is printed. Alternatively, if the printing device 40 does not receive an instruction to print the hold job or print, job, the printing device 40 does not print the job.

FIG. 21 is an example of a buyer set-up 2100 in accordance with an exemplary embodiment. As, shown in FIG. 21, the buyer set-up (or user interface) can include Default Settings 2110, which are static and do not change, which can include, for example, price, schedule, location, and print quality. In accordance with an exemplary embodiment, for example, the Default Settings are preprogrammed into the buyer set-up 2100. However, the buyer may also input dynamic or Time of Order Preferences, in which one or more the static setting can be changed at the buyer's request. For example, the price, location, and print quality can be changed and/or modified. In addition, finishing capabilities 2130, which can include, for example, cover insert, staple, binding, saddle stitch, perfect bind, ring bind, hole punch, duplex, etc. can be specified. The buyer set-up 2100 can also include Time of Order Data 2140, for example, which can include the file name and number of copies requested. In addition, Target Measurement Data 2150 and Comments 2160 can be added, which can include, for example, special requests.

FIG. 22 is an example of a seller set-up 2200 in accordance with an exemplary embodiment. As shown in FIG. 22, the seller set-up 2200 (or user interface) can include specific details about the printer or printing device 2210, for example, engine, model, engine speed (RPM), resolution (DPI), and finishing capabilities 2220. As set forth in the buyer set-up 2100, the finishing capabilities can include, for example, Cover Insert, Staple, Binding, Saddle Stitch, Perfect Bind, Ring Bind, Hole Punch, Duplex, etc. In addition, the seller set-up 2200 includes price and schedule 2230.

As shown in FIG. 21, the buyers can create an account in the marketplace to indicate their user preference in quality (print), cost, delivery (schedule) and geographic location relative to buyer's location. In return, the sellers can create an account as shown in FIG. 22 to indicate their printing device and their unique finisher capability. In accordance with an exemplary embodiment, once the system is set-up for buyers and sellers, then next step is when a buyer wants to purchase a printing service, buyer fills out each item as indicated on the buy set-up 2100. In accordance with an exemplary embodiment, the buyer may override the default preferences (static) 2110 based on the print job requirements. In accordance with an exemplary embodiment, any, preference left blank can revert to the default setting (static) 2110.

Figure 23:
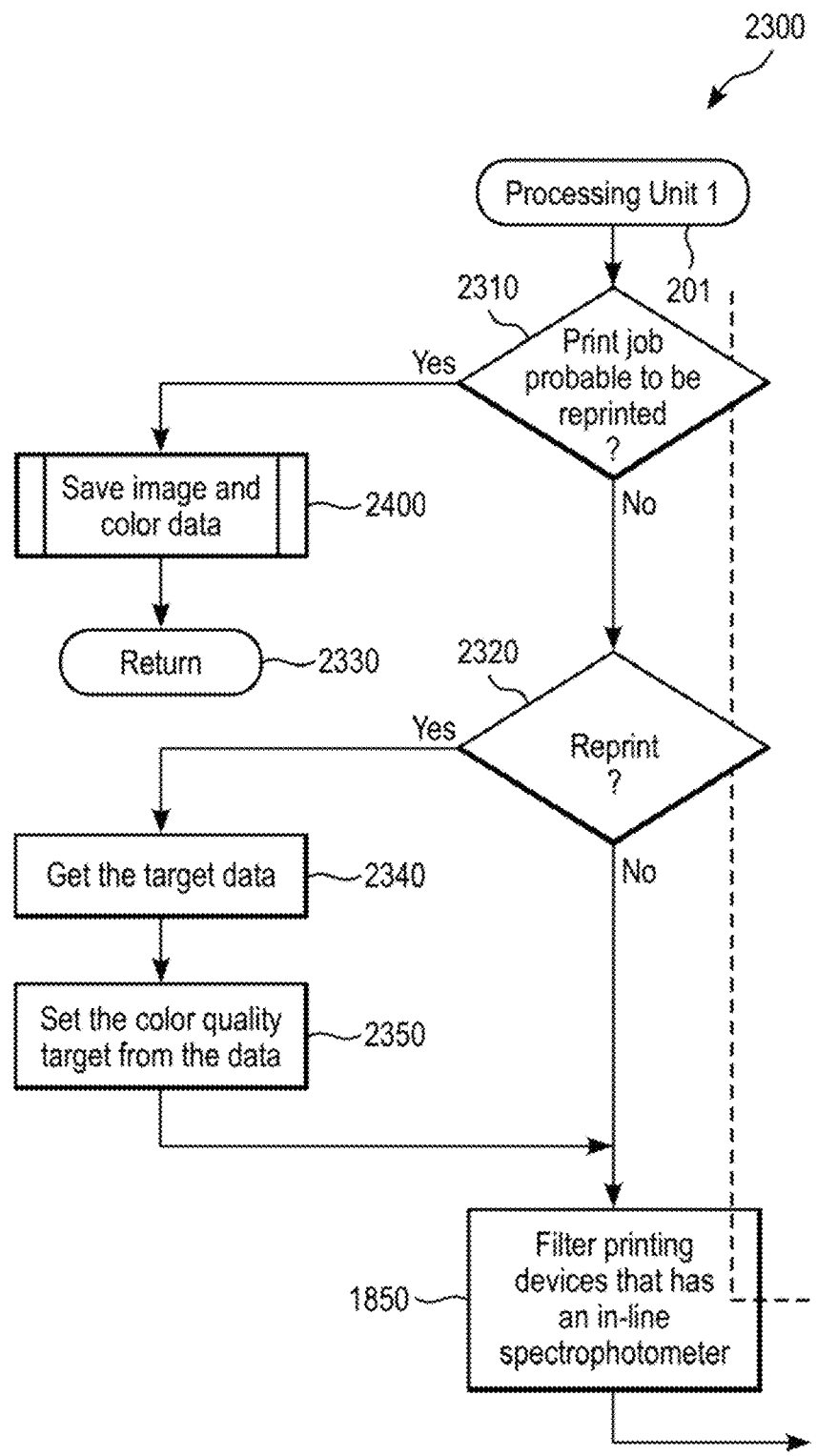
FIG. 23 is a flow chart showing illustrating a process for determining the best printing device amongst a group or plurality of printers using, a spectrophotometer for a reprint job in accordance with another exemplary embodiment.

FIG. 23 is a flow chart 2300 showing illustrating a process for determining the best printing device amongst a group or plurality of printers using a spectrophotometer for a reprint job in accordance with another exemplary embodiment. In accordance with an exemplary embodiment, the Processing Unit 1 201 of the server 20 can receive input from the user via the graphical user interface (or GUI) 600 that the print job may be reprinted by selection of "Save Target for Reprint" 640. In step 2310, if the user selects "Save Target for Reprint" on the GUI 600 of the client 30, the process continues to step 2400, wherein image and color data is saved with the print job, as shown in FIG. 24.

In accordance with an exemplary embodiment, when it is determined that the user has selected the "Save Target for Reprint", and it is probable that the user will request a "Reprint" or reprinting of the print job, the process includes determining at least one printer 40 which has an in-line spectrophotometer from the plurality of printers 40, determining at least one page to be measured as a target page, and sending the print job to the at least one printer 40 so that the determined page is measured as the target. In accordance with an exemplary embodiment, when it is determined that the print job is to be reprinted, and the at least one printer is a single printer, the Processing Unit 1 201 of the server 20 obtains measured data on the print job from the single printer, and stores the measured data in conjunction with the print job.

FIG. 24 is a flow chart 2400 showing a server 20 and a printer 40 illustrating a process for determining the best printing device amongst a group or plurality of printers using a spectrophotometer for a reprint job, and wherein the user has selected "Save Target for Reprint" on the GUI 600. As shown in FIG. 24, in step 2410, the Processing Unit 1 201 of the server 20 determines (decides) which pages of the print job should be saved for the target (or target data). In accordance with an exemplary embodiment, the step of determining the at least one page to be measured as a target as shown in step 2410, can include, for example, determining the at least one page based on density of a C, M, Y, K (CMYK) color model used in color printing. For example, the CMYK density (also known as "YMCK"), for example, the criteria can be a predetermined amount (or threshold) of coverage or area on a printed page, for example, at least a minimum amount of coverage or area of the printed page has color in accordance with a CMYK or YMCK color model. In addition, the criteria can be based on the number of pages or number of copies of a print job. For example, if the number of pages in the print job exceeds a predetermined number of pages, for example, 1000 pages, the $1^{st}$ page and the last page, which meet a certain criteria can be selected. In addition, if the print job exceeds a predetermined number of copies, for example, 1000 copies, pages from the $1^{st}$ copy and pages from the last copy, which meet a certain criteria can, be selected.

Figure 25:
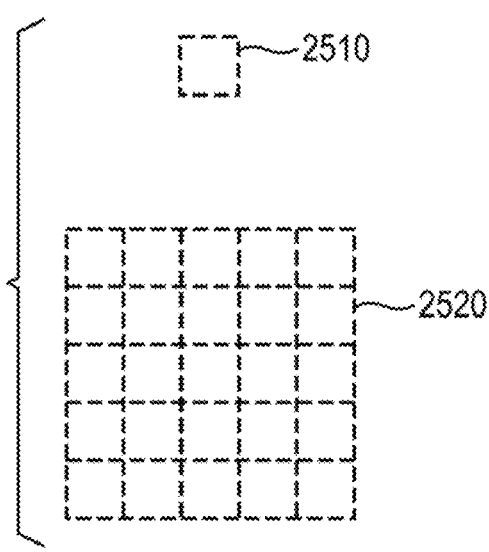
FIG. 25 is an illustration of a pixel box and a plurality of pixel boxes used for determining if a page is to be printed as the target.

In accordance with an exemplary embodiment, for example, as shown in FIG. 25, a criteria for deciding if a page is to be printed for the target can be whether a page has pixel blocks 2510, 2520, corresponding to a predetermined combinations of Y, C, and K values (YMCK values). For example, a FOGRA39L chart, which is a characterization data set for color imaging or printing, has 1617 combinations of Y, M, C, and K values, and the user can set that a predetermined number of the 1617 combinations may be the predetermined combinations, for example, 20. However, if the 20 combinations are included in a single page, an in-line sensor cannot accurately measure the color when pixel blocks is too small (for example, only one pixel 2510. Therefore, in accordance with an exemplary embodiment, the criteria can include both YMCK value combinations and pixel block size.

For example, in accordance with another exemplary embodiment, when one of the YMCK value combinations is (Y, M, C, K)=(200, 200, 0, 0), this pixel block is OK (i.e., acceptable) on YMCK value but is not sufficient (or no good) on block size. Accordingly, for example, it would be desirable to have a pixel block, which is comprised of a plurality of pixel blocks 2520, which is acceptable on both the YMCK value and block size.

In step 2420, the Processing Unit 1 201, sends the print job including pages for the target to Processing Unit 2 401 of the printer 40. In step 2430, the Processing Unit 2 401 receives the print request from the Processing Unit 1 201 of the server 20. In step 2440, the process of receiving pages from the Processing Unit 1 201 on the Processing Unit 2 401 repeats (or continues) until all the pages are received by the printer 40. In step 2450, the printer 40 prints the page(s) received from the Processing Unit 1 201. In step 2460, the Processing Unit 2 401 determines if the printed page is a target, page. If the printer page is a target page, in step 2470, the target page is scanned and the color is measured by the in-line spectrophotometer 411. In step 2472, the image and the color values obtained by the in-line spectrophotometer are sent to the Processing Unit 1 201. If the printed page is not a target page, the printer 40 does not scan the page with the in-line spectrophotometer 411. The process repeats until each of the pages has been printed. In step 2490, the Processing Unit 1 201 receives the target data from the Processing Unit 2 401 and saves the images and color values with the job for use later for a "Reprint" job.

In accordance with an exemplary embodiment, in step 2310, if the print job is not probable for reprinting since the user has not selected "Save Target for Reprint" 640, the process continues to step 2320, in which the user is asked, if the print job is a "Reprint" 644 as shown in FIG. 6. If the user selects or does not indicate that the current print job is a "Reprint" 644, the process continues to step 1850 and proceeds for filtering of printers (or printing devices) 40 that have an in-line spectrophotometer 411 and printing of the print job as disclosed herein and shown in FIGS. 18-20.

Alternatively, if the user indicates that the print job is a "Reprint" 644 in step 2340, the target data previously saved in step 2400 is retrieved from the Processing Unit 1 201 of the server 20. In step 2350, a color quality target from the data is set and the process continues to step 1850 for filtering of printing devices that has an in-line spectrophotometer and printing of the print job as shown in FIGS. 18-20 and described herein.

In accordance with an exemplary embodiment, for example, when it is determined that the print job is a "Reprint" request, i.e., a setting of reprint has been requested by the user in the GUI 644, and the Processing Unit 201 of the server 20 has obtained the measured data on the print job from the two or more printers, the Processing Unit 1 201, can determine at least one candidate of a destination printer for the print job based on whether each of the two or more printers meets a predetermined print quality by comparing the measured data with a measured data on a prior job.

In accordance with an exemplary embodiment, when it is determined that the print job is a "Reprint" job, or has a setting of reprint 644, the at least one page measured as the target page can be determined based on which page has been measured as the target on a prior job. Alternatively, the at least one page measured as the target page can be determined based on a page count of the print job. In accordance with an exemplary embodiment, if the at least one page can be determined based on the pages that was previously measured for a prior job, or by conducting a validation and/or calibration process using the at least one page after starting the print job.

In accordance with an exemplary embodiment, if none of the two or more printers 40 meets a predetermined print quality, the Processing Unit 1 201 of the server 20 can determine at least one printer 40 from the two or more printers 40 and instruct each of the at least one printers 40 to conduct a color calibration process by using the in-line, spectrophotometer. The Processing Unit 1 201 can receive, from each of the at least one printers 40, a result corresponding to the color calibration process by the in-line spectrophotometer, and can determine the destination printer for the print job, based on the result corresponding to the color calibration process. The Processing Unit 1 201 can then instruct the destination printer 40 to conduct the print job.

Figure 26:
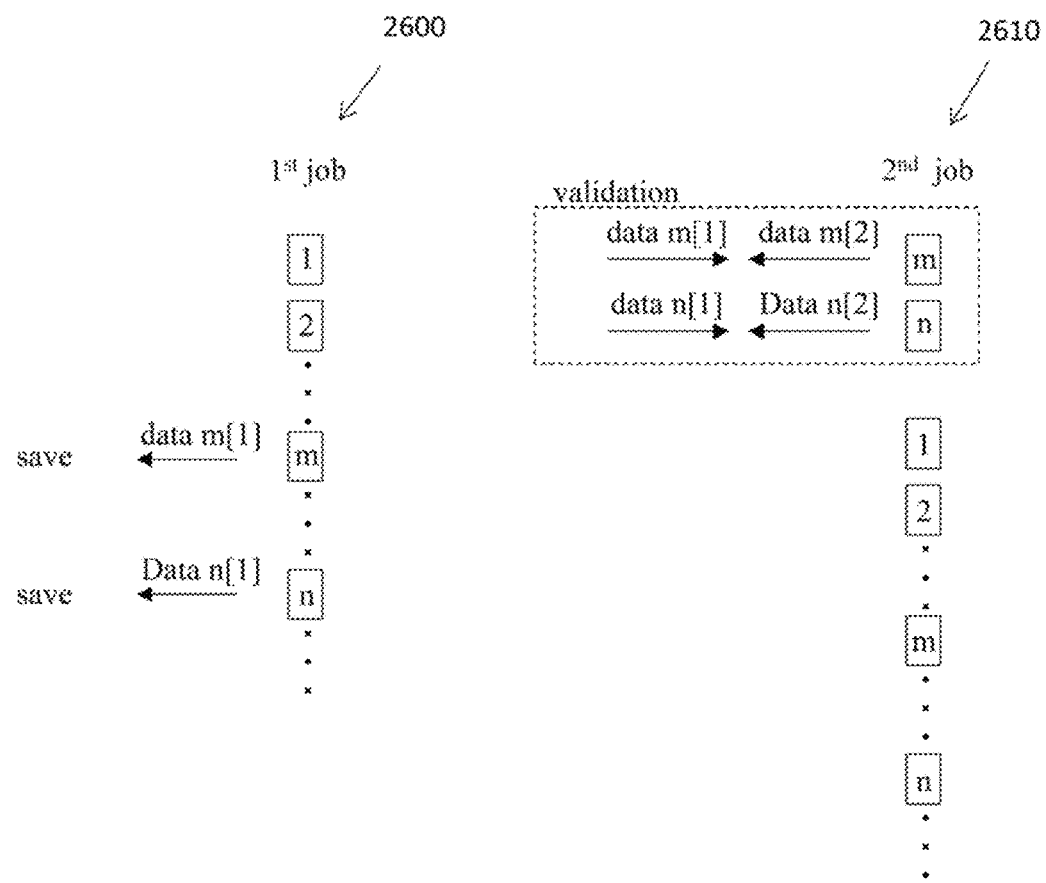
FIG. 26 is an illustration of a method for saving measured data from a first print job and using the saved measured data for validation on a second print job or reprint job in accordance with an exemplary embodiment.

FIG. 26 is an illustration of a method for saving measured data from a first print job ($1^{st}$ job) 2600 and using the saved measured data for validation on a second print job, or reprint job ($2^{nd}$ job) 2610 in accordance with an exemplary embodiment. As shown in FIG. 26, the first job (or print job 2600) can include a plurality of pages, for example, pages 1, 2, . . . , m, . . . n, . . . . In accordance with an exemplary embodiment, for example, as disclosed herein, pages m and n, and corresponding measured data m[1] and n[1] have been determined in accordance with one or more criteria as appropriate to be saved for a "Reprint" job. In a second job 2610, which is determined or identified by the user to be a "Reprint" job 644, the saved measured data m[1] and n[1] can be compared in a validation process to data m[2] and n[2] from one or more candidates of a destination printer 40 from the plurality of printers 40. In accordance with an exemplary embodiment, the at least one candidate can be determined to be the destination printer 40 for the print job based on whether each of the two or more printers 40 meets the predetermined print quality by comparing the measured data m[2] and n[2] with the measured data m[1] and n[1] on the prior job ($1^{st}$ Job) 2600.

Figure 27:
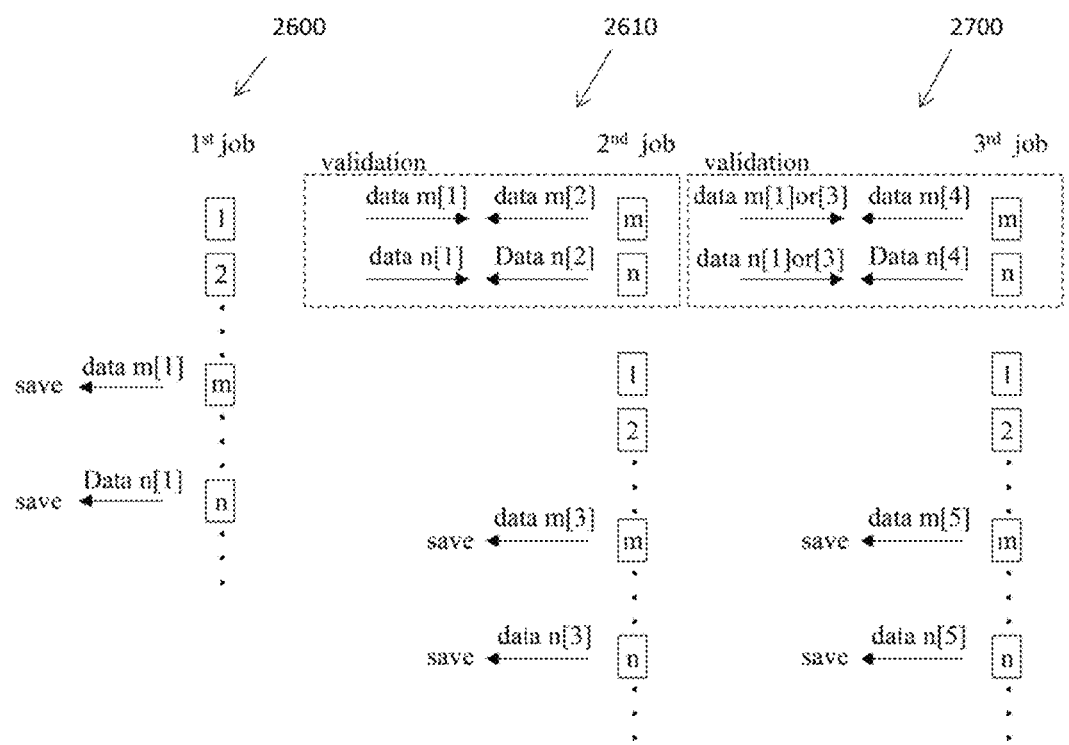
FIG. 27 is an illustration of a method for saving measured data from a first print job and using the saved measured data for validation on a subsequent print job (or reprint job), for example, a second print job or third job in accordance with an exemplary embodiment.

FIG. 27 is an illustration of a method for saving measured data from a first print job (1st job) 2600 and using the saved measured data for validation on a subsequent print job (or reprint job), for example, a second print job (2nd job) 2610 or a third job (3rd job) 2700 in accordance with an exemplary embodiment. As shown in FIG. 27, the first job (or print job) 2600 can include a plurality of pages, for example, pages 1, 2, . . . , m, . . . n, . . . . In accordance with an exemplary embodiment, for example, as disclosed herein, pages m and n, and corresponding measured data m[1] and n[1] have been determined in accordance with one or more criteria as appropriate to be saved for a "Reprint" job. In a second job (2nd job) 2610, which is determined or identified by the user to be a "Reprint" job, the saved measured data m[1] and n[1] is compared in a validation process to data m[2] and n[2] to determine at least one candidate of a destination printer 40 for the print job based on whether each of the two or more printers 40 meets the predetermined print quality by comparing the measured data with a measured data on a prior job. During the printing of the second, print job 2610, corresponding measured date m[3] and n[3] corresponding to the measured data in the second print job 2610 can be saved for further reprint jobs.

In accordance with an exemplary embodiment, in a third print job (3rd job) 2700, which is determined or identified by the user to be a "Reprint" job, the saved measured data m[1] and n[1] or m[3] and n[3] can be compared in a validation process to data m[4] and n[4] to determine at least one candidate of a destination printer 40 for the print job based on whether each of the two or more printers 40 meets the predetermined print quality by comparing the measured data m[4] and n[4] with measured data m[1] or m[3] and n[1] or n[3], respectively, on the prior jobs (2nd job or 3rd job) 2600, 2610. In addition, as shown in FIG. 27, measured data for pages m and n in the third print job 2700 can be saved as data m[5] and n[5].

Figure 28:
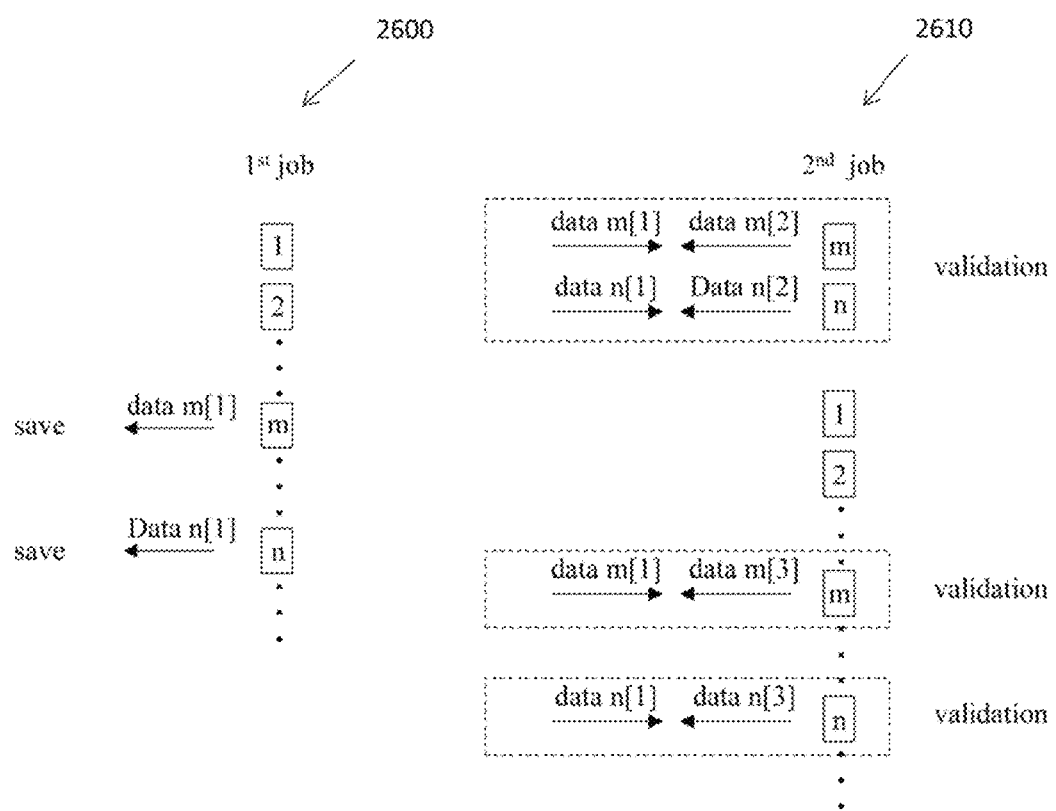
FIG. 28 is an illustration of a method for saving measured data from a first print job and using the saved measured data for validation on a second print job or reprint job in accordance with an exemplary embodiment.

FIG. 28 is an illustration of a method for saving measured data from a first print job 2600 and using the saved measured data for validation on a second print job or reprint job (2nd job) 2610 in accordance with an exemplary embodiment. As shown in FIG. 28, the first job or print job (1st job) 2600 can include a plurality of pages, for examples, pages 1, 2, . . . , m, . . . n, . . . . In accordance with an exemplary embodiment, for example, as disclosed herein, pages m and n, and corresponding measured data m[1] and n[1] have been determined in accordance with one or more criteria as appropriate to be saved for a "Reprint" job. In a second job (2nd job) 2610, which is determined or identified by the user to be a "Reprint" job, the saved measured data m[1] and n[1] can be compared in a validation process to data m[2] and n[2] to determine at least one candidate of a destination printer 40 for the print job based on whether each of the two, or more printers 40 meets the predetermined print quality by comparing the measured data with a measured data on a prior job. In addition, in accordance with an exemplary embodiment, during the printing of the second print job 2610, corresponding measured date m[3] and n[3] corresponding to the measured data in the second print job 2610 can be used for validation by comparing the measured data m[1] and n[1] from the first print job and the measured data m[3] and n[3] from the second or "Reprint print" 2610 to determine if the second print job (2nd job) 2610 meets the predetermined print quality.

Figures 29, 30:
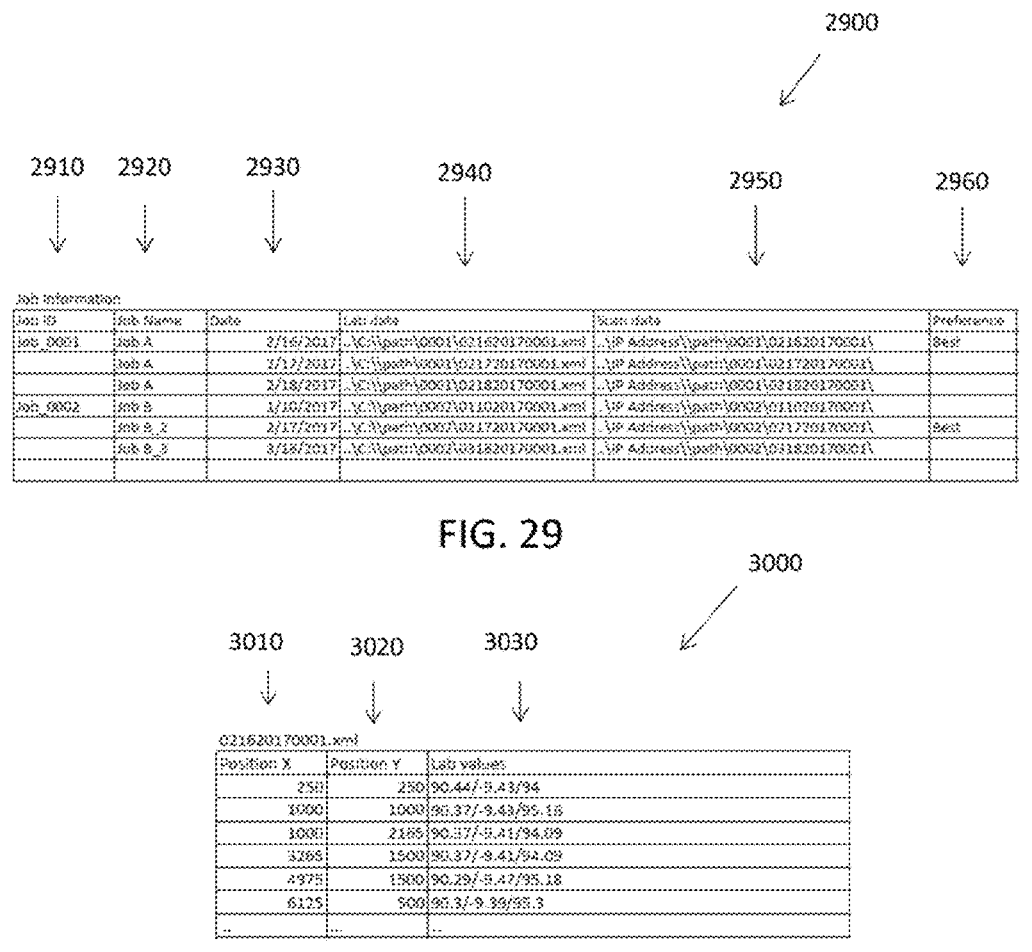

FIG. 29 is a job chart 2900 illustrating saved job information and related data in accordance with an exemplary embodiment. As shown in FIG. 29, the job information chart 2900 can include Job id (Job identifier) 2910, Job Name 2920, Date of job (i.e., Date) 2930, Lab data 2940, Scan data 2950, and Preference 2960, for example, "Best" available. The preference "Best" available can include, for example, selecting a destination printer 40, which meets or exceeds a predetermined print quality based on comparing the measured data with a measured data on a prior job. In accordance with an exemplary embodiment, for example, the Lab data 2940 and the Scan data 2950 can relate to the measured data for a printed page as saved, for example, in Processing Unit 1 201 and as shown in FIG. 30.

FIG. 30 is a chart 3000 illustrating saved data for a page of a print job in accordance with an exemplary embodiment. For example, the saved data for a print job can include, for example, information such reading related to page position (x, y), for example, Position X 3010, Position Y 3020, and corresponding Lab values 3030, for the x, y positions 3010, 3020 on the page. In accordance with an exemplary embodiment, for example, the lab values 3030 can be based on, for example, CMYK or YMCK color charts, such as FOGRA39L.

In accordance with an exemplary embodiment, the methods and processes as disclosed can be implemented on a non-transitory computer readable medium. The non-transitory computer readable medium may, be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that, various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A print management method implemented in a system including a client computer, a server, and a plurality of printers, comprising:
by the server:
(a) receiving, from the client computer, a request relating to a print job;
(b) determining whether a predetermined print quality is required for the print job;
(c) filtering at least two printers each of which has an in-line spectrophotometer from the plurality of printers;
(d) instructing the each filtered at least two printers to conduct a color validation process by using the in-line spectrophotometer;
(e) receiving, from the each filtered at least two printers, a result corresponding to the color validation process by the in-line spectrophotometer; and
(f) determining at least one candidate of a destination printer for the print job based on whether the each filtered at least two printers meets predetermined print quality, using the result corresponding to the color validation process.

2. The method of claim 1, wherein none of the at least two printers meets the predetermined print quality, further comprising:
by the server:
(g) filtering at least one printer from the filtered at least two printers;
(h) instructing the filtered at least one printer to conduct a color calibration process by using the in-line spectrophotometer;
(i) receiving, from the filtered at least one printer, a result corresponding to the color calibration process by the in-line spectrophotometer;
(j) determining the destination printer for the print job, based on the result corresponding to the color calibration process; and
(k) instructing the destination printer to conduct the print job.

3. The method of claim 1, wherein the predetermined print quality is a setting of a high color quality print, and wherein the high color quality print has a color quality exceeding a predetermined print quality target.

4. The method of claim 1, wherein the predetermined print quality is a setting of a print probable to be reprinted.

5. The method of claim 1, wherein the predetermined print quality is a setting of reprint.

6. The method of claim 1, wherein in step (d), sending, to the each filtered at least two printers, data corresponding to a document to be printed and data corresponding to a color chart to be used for the color validation process.

7. The method of claim 6, further comprising:
by the each filtered at least two printers,
(l) starting a ripping process for the document before the server instructs the destination printer to conduct the print job.

8. The method of claim 6, further comprising:
by the server,
(m) instructing to delete the document data and color chart data to a printer other than the destination printer among the filtered at least two printers.

9. The method of claim 1, wherein the predetermined print quality is a setting of reprint, wherein in step (f), the at least one candidate is determined based on a comparison with the result of the print job and a prior print job.

10. The method of claim 2, wherein the predetermined print quality is a setting of reprint, and wherein in step (j) the destination printer is determined based on a comparison with the result of the print job and a prior print job.

11. The method of claim 1, comprising:
by the client computer:
inputting the request relating to the print job on a graphical user interface, the request including one or more of the following:
price, schedule or due date, location of printers, the predetermined print quality, and at least one finishing capability, the at least one finishing capability including cover insert, staple, binding, saddle stitch, perfect bind, ring bind, hole punch, and duplex printing.

12. The method of claim 1, comprising:
checking for an availability of printers outside of a market place or print shop using Simple Network Management Protocol (SNMP) and a Management Information Base (MIB).

13. The method of claim 1, comprising:
arranging the plurality of printers in a market place, the market place comprising at least two print shops.

14. The method of claim 1, comprising:
arranging the plurality of printers in a print shop.

15. The method of claim 1, comprising:
connecting the client computer, the server, and the plurality of printers by a communication network.

16. A non-transitory computer readable program code configured to execute a process as recited in claim 1.

17. A print management method implemented in a system including a client computer, a server and a plurality of printers, comprising:
by the server:
(a) receiving, from the client computer, a request relating to a print job;
(b) determining whether a predetermined print quality is required for the print job;
(c) determining at least two printers each of which has an in-line spectrophotometer from the plurality of printers;
(d) instructing the each determined at least two printers to conduct a color validation process by using the in-line spectrophotometer;
(e) receiving, from the each determined at least two printers, a result corresponding to the color validation process by the in-line spectrophotometer; and
(f) determining at least one candidate of a destination printer for the print job based on whether the each determined at least two printers meets predetermined print quality, using the result corresponding to the color validation process.

18. The method of claim 17, wherein none of the at least two printers meets the predetermined print quality, further comprising:
by the server:
(g) determining at least one printer from the determined at least two printers;
(h) instructing the determined at least one printer is conduct a color calibration process by using the in-line spectrophotometer;
(i) receiving, from the determined at least one printer, a result corresponding to the color calibration process by the in-line spectrophotometer;
(j) determining the destination printer for the print job, based on the result corresponding to the color calibration process; and
(k) instructing the destination printer to conduct the print job.

19. The method of claim 17, wherein in step (d), sending, to the each determined at least two printers, data corresponding to a document to be printed and data corresponding to a color chart to be used for the color validation process; and
by the each determined at least two printers,
(l) starting a ripping process for the document before the server instructs the destination printer to conduct the print job.

20. The method of claim 19, further comprising:
by the server,
(m) instructing to delete the document data and color chart data to a printer other than the destination printer among the determined at least two printers.

* * * * *